*(12)* United States Patent
Kubo et al.

(10) Patent No.: US 8,169,457 B2
(45) Date of Patent: May 1, 2012

(54) LIGHT SOURCE APPARATUS, OPTICAL-BEAM SCANNING APPARATUS, AND IMAGE FORMING APPARATUS

(75) Inventors: Nobuaki Kubo, Tokyo (JP); Yasuhiro Naoe, Kanagawa (JP); Tomohiro Nakajima, Kanagawa (JP); Naoto Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 211 days.

(21) Appl. No.: 12/648,426

(22) Filed: Dec. 29, 2009

(65) Prior Publication Data

US 2010/0183337 A1     Jul. 22, 2010

(30) Foreign Application Priority Data

Jan. 16, 2009  (JP) .................... 2009-007574

(51) Int. Cl.
*B41J 15/14*         (2006.01)
*B41J 27/00*         (2006.01)
(52) U.S. Cl. ........................ 347/242; 347/257
(58) Field of Classification Search .......... 347/230, 347/238, 241, 242, 256, 257
See application file for complete search history.

(56) References Cited

U.S. PATENT DOCUMENTS

| | | | |
|---|---|---|---|
| 5,633,744 A | 5/1997 | Nakajima |
| 5,671,077 A | 9/1997 | Imakawa et al. |
| 5,753,907 A | 5/1998 | Nakajima et al. |
| 5,786,594 A | 7/1998 | Ito et al. |
| 5,793,408 A | 8/1998 | Nakajima |
| 5,936,756 A | 8/1999 | Nakajima |
| 5,999,345 A | 12/1999 | Nakajima et al. |
| 6,052,211 A | 4/2000 | Nakajima |
| 6,091,534 A | 7/2000 | Nakajima |
| 6,376,837 B1 | 4/2002 | Itabashi et al. |
| 6,621,512 B2 | 9/2003 | Nakajima et al. |
| 6,657,765 B2 | 12/2003 | Hayashi et al. |
| 6,775,041 B1 | 8/2004 | Nakajima |
| 6,839,157 B2 | 1/2005 | Ono et al. |
| 6,932,271 B2 | 8/2005 | Nakajima et al. |
| 6,972,883 B2 | 12/2005 | Fujii et al. |
| 6,995,885 B2 | 2/2006 | Nakajima |
| 7,068,296 B2 | 6/2006 | Hayashi et al. |
| 7,075,688 B2 | 7/2006 | Nakajima |
| 7,170,660 B2 | 1/2007 | Nakajima |
| 7,221,493 B2 | 5/2007 | Fujii et al. |
| 7,301,554 B2 | 11/2007 | Kubo |
| 7,333,254 B2 | 2/2008 | Amada et al. |

(Continued)

FOREIGN PATENT DOCUMENTS

JP        08287501 A   * 11/1996

(Continued)

*Primary Examiner* — Hai C Pham
(74) *Attorney, Agent, or Firm* — Dickstein Shapiro LLP

(57) ABSTRACT

A light source apparatus includes a circuit board on which a light source unit including a vertical-cavity surface-emitting light source and a package that houses the vertical-cavity surface-emitting light source is mounted, an optical element holder that holds a plurality of optical elements including at least a coupling lens, and an intermediate holder that is arranged between the circuit board and the optical element holder. The intermediate holder is joined to the circuit board to cover an area of the circuit board on which the light source unit is mounted to thereby make contact with the package such that the vertical-cavity surface-emitting light source is positioned and fixed and joined to the optical element holder to thereby position the optical elements to the vertical-cavity surface-emitting light source.

6 Claims, 12 Drawing Sheets

U.S. PATENT DOCUMENTS

| | | |
|---|---|---|
| 7,411,712 B2 | 8/2008 | Nakajima et al. |
| 7,417,780 B2 | 8/2008 | Fujii et al. |
| 7,423,787 B2 | 9/2008 | Nakajima |
| 7,468,824 B2 | 12/2008 | Nakajima |
| 7,471,306 B2 | 12/2008 | Nakajima |
| 7,495,813 B2 | 2/2009 | Akiyama et al. |
| 7,511,868 B2 | 3/2009 | Nakajima |
| 7,525,561 B2 | 4/2009 | Nakajima et al. |
| 7,529,011 B2 | 5/2009 | Fujii |
| 7,532,227 B2 | 5/2009 | Nakajima et al. |
| 7,545,547 B2 | 6/2009 | Hayashi et al. |
| 7,561,318 B2 | 7/2009 | Nakajima |
| 7,593,029 B2 | 9/2009 | Satoh et al. |
| 7,599,105 B2 | 10/2009 | Nakajima |
| 2005/0062836 A1 | 3/2005 | Nakajima |
| 2005/0105156 A1 | 5/2005 | Ono et al. |
| 2005/0190420 A1 | 9/2005 | Imai et al. |
| 2006/0132880 A1 | 6/2006 | Amada et al. |
| 2006/0158711 A1 | 7/2006 | Imai et al. |
| 2006/0209372 A1* | 9/2006 | Tada .................. 359/196 |
| 2006/0284968 A1 | 12/2006 | Hayashi et al. |
| 2007/0058255 A1 | 3/2007 | Imai et al. |
| 2007/0146738 A1 | 6/2007 | Nakajima |
| 2007/0146856 A1 | 6/2007 | Nakajima |
| 2007/0206259 A1 | 9/2007 | Nakajima |
| 2008/0024590 A1 | 1/2008 | Nakajima |
| 2008/0062491 A1 | 3/2008 | Nakamura et al. |
| 2008/0117487 A1 | 5/2008 | Amada et al. |
| 2008/0192323 A1 | 8/2008 | Nakamura et al. |
| 2008/0204852 A1 | 8/2008 | Amada et al. |
| 2008/0212156 A1 | 9/2008 | Nakajima |
| 2008/0212999 A1 | 9/2008 | Masuda et al. |
| 2008/0218827 A1 | 9/2008 | Watanabe et al. |
| 2008/0219601 A1 | 9/2008 | Arai et al. |
| 2008/0239433 A1 | 10/2008 | Amada et al. |
| 2008/0285104 A1 | 11/2008 | Arai et al. |
| 2009/0060583 A1 | 3/2009 | Amada et al. |
| 2009/0073524 A1 | 3/2009 | Nakajima |
| 2009/0153933 A1 | 6/2009 | Tsuchiya et al. |
| 2009/0195636 A1 | 8/2009 | Arai et al. |
| 2009/0225383 A1 | 9/2009 | Soeda et al. |
| 2009/0231557 A1 | 9/2009 | Kubo |

FOREIGN PATENT DOCUMENTS

| | | |
|---|---|---|
| JP | 2000-358131 A | 12/2000 |
| JP | 2002-341273 A | 11/2002 |
| JP | 2003-211728 A | 7/2003 |
| JP | 2004-6592 A | 1/2004 |

* cited by examiner

B-B

C-C

D-D

LIGHT SOURCE APPARATUS, OPTICAL-BEAM SCANNING APPARATUS, AND IMAGE FORMING APPARATUS

CROSS-REFERENCE TO RELATED APPLICATIONS

The present application claims priority to and incorporates by reference the entire contents of Japanese Patent Application No. 2009-007574 filed in Japan on Jan. 16, 2009.

BACKGROUND OF THE INVENTION

1. Field of the Invention

The present invention relates to a light source apparatus employed in an optical-beam scanning apparatus for use in a writing system, such as a digital copying machine and a laser printer, and including a vertical-cavity surface-emitting light source, an optical-beam scanning apparatus that forms an image at high speed by performing scanning with an optical beam emitted from the light source apparatus, and an image forming apparatus that employs the optical-beam scanning apparatus.

2. Description of the Related Art

With a tandem multi-color image-forming apparatus, in which photosensitive drums for different colors are arranged along a conveying direction of a transfer member, a multiple-color image is formed by superimposing color toner images each formed in a corresponding one of image forming stations on one another while a recording medium is conveyed only once along the image forming stations, which can result in speedup (see Japanese Patent Application Laid-open No. 2002-341273, for example).

Meanwhile, multi-beam scanning apparatuses have been proposed as systems that speed up optical scanning apparatuses. A multi-beam scanning apparatus performs scanning with multiple beams at a time to record a plurality of neighboring lines simultaneously, thereby achieving speedup without increasing the rotation speed of a polygon scanner, which is a deflecting unit.

Japanese Patent Application Laid-open No. 2003-211728 proposes a technique of performing scanning by using a two-dimensional array device (vertical-cavity surface-emitting semiconductor laser (VCSEL) array) to form a plurality of lines simultaneously. Because use of a two-dimensional array device allows to increase the number of light emitting sources to as many as dozens or more, sub-scanning pitch on a photosensitive member can be set to one-nth of recording density. Image recording can be performed with higher definition by configuring a unit of pixels in a matrix of multiple, n×m dots.

Such a two-dimensional array device that includes as many as dozens of light sources is typically housed in a ceramic package or the like that includes a lead frame and directly soldered onto a circuit board. Accordingly, the two-dimensional array device is to be attached for fixation to a support of a light source unit with a circuit board therebetween; however, because the height where the two-dimensional array device is mounted varies due to soldering work, dimensional relationship between the surface of the circuit board and the surface of the package is not fixed. Therefore, the technique of supporting the light source unit with reference to the circuit board surface is disadvantageous in failing to position the two-dimensional array device accurately.

To this end, Japanese Patent Application Laid-open No. 2004-6592 discloses a technique of pressing a package member with a circuit board by resiliently deforming the circuit board so that the package surface is positioned without fail.

Meanwhile, multi-color image-forming apparatuses are becoming increasingly faster year after year and hence finding increased use in digital duplication as on-demand printing systems recently. This places demand on the multi-color image-forming apparatuses to have higher definition image quality.

The use of the two-dimensional array device mentioned earlier allows to set sub-scanning pitch on a photosensitive member to one-nth of recording density. Accordingly, high-definition image quality can be obtained by configuring a unit of pixels in a matrix of multiple, n×m dots.

However, as mentioned earlier, a two-dimensional array device is housed in a package, and the two-dimensional array device and the package to each other with an adhesive such as an epoxy adhesive, which makes it disadvantageously difficult to perform highly-accurate positioning even with use of a jig or the like. In addition, because the two-dimensional array device is directly soldered to a circuit board, positioning the two-dimensional array device relative to the support in the light source unit is disadvantageously difficult.

It is also necessary to continuously assure positioning accuracy relative to a coupling lens, which is to be coupled to the two-dimensional array device, in a unit of several micrometers. Failure to assure this positioning accuracy affects a beam spot diameter and a beam pitch of beams irradiated onto a photosensitive member and disadvantageously degrade image quality by a large degree.

With this regard, the technique described in Japanese Patent Application Laid-open No. 2004-6592 is advantageous in that positioning is performed by bringing the package surface of the two-dimensional array device into contact with the circuit board; however, this technique is disadvantageously less reliable in that forcible deforming of the circuit board can develop component defect, such as detachment of solder from electronic components mounted on the circuit board.

SUMMARY OF THE INVENTION

It is an object of the present invention to at least partially solve the problems in the conventional technology.

According to one aspect of the present invention, there is provided a light source apparatus including: a circuit board on which a light source unit is mounted, the light source including a vertical-cavity surface-emitting light source and a package, the vertical-cavity surface-emitting light source being formed with a two-dimensional array of a plurality of light-emitting sources arranged on a plane normal to an optical axis along which an optical beam is emitted, the package housing the vertical-cavity surface-emitting light source; an optical element holder that holds a plurality of optical elements including at least a coupling lens that collimates the optical beam or diverges or converges the optical beam with a predetermined convergence or divergence angle; and an intermediate holder that is arranged between the circuit board and the optical element holder, the intermediate holder being joined to the circuit board to cover an area of the circuit board on which the light source unit is mounted to thereby make contact with the package such that the vertical-cavity surface-emitting light source is positioned and fixed and being joined to the optical element holder to thereby position the optical elements to the vertical-cavity surface-emitting light source.

Furthermore, according to another aspect of the present invention, there is provided an optical-beam scanning apparatus including: a light source apparatus that includes a circuit board on which a light source unit is mounted, the light source including a vertical-cavity surface-emitting light source and a package, the vertical-cavity surface-emitting light source being formed with a two-dimensional array of a plurality of light-emitting sources arranged on a plane normal to an optical axis along which an optical beam is emitted, the package housing the vertical-cavity surface-emitting light source, an optical element holder that holds a plurality of optical elements including at least a coupling lens that collimates the optical beam or diverges or converges the optical beam with a predetermined convergence or divergence angle, and an intermediate holder that is arranged between the circuit board and the optical element holder, the intermediate holder being joined to the circuit board to cover an area of the circuit board on which the light source unit is mounted to thereby make contact with the package such that the vertical-cavity surface-emitting light source is positioned and fixed and being joined to the optical element holder to thereby position the optical elements to the vertical-cavity surface-emitting light source; a deflecting unit that deflects the optical beam emitted from the light source apparatus; and an image-forming optical system that forms an image on a scanning surface with the optical beam deflected by the deflecting unit.

Moreover, according to still another aspect of the present invention, there is provided an image forming apparatus including: an optical-beam scanning apparatus that includes a light source apparatus that includes a circuit board on which a light source unit is mounted, the light source including a vertical-cavity surface-emitting light source and a package, the vertical-cavity surface-emitting light source being formed with a two-dimensional array of a plurality of light-emitting sources arranged on a plane normal to an optical axis along which an optical beam is emitted, the package housing the vertical-cavity surface-emitting light source, an optical element holder that holds a plurality of optical elements including at least a coupling lens that collimates the optical beam or diverges or converges the optical beam with a predetermined convergence or divergence angle, and an intermediate holder that is arranged between the circuit board and the optical element holder, the intermediate holder being joined to the circuit board to cover an area of the circuit board on which the light source unit is mounted to thereby make contact with the package such that the vertical-cavity surface-emitting light source is positioned and fixed and being joined to the optical element holder to thereby position the optical elements to the vertical-cavity surface-emitting light source, a deflecting unit that deflects the optical beam emitted from the light source apparatus, and an image-forming optical system that forms an image on a scanning surface with the optical beam deflected by the deflecting unit; a photosensitive member on which the optical beam from the optical-beam scanning apparatus is focused to form an electrostatic image; a developing unit that develops the electrostatic image formed on the photosensitive member with toner to obtain a toner image; and a transfer unit that transfers the toner image onto a recording medium.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
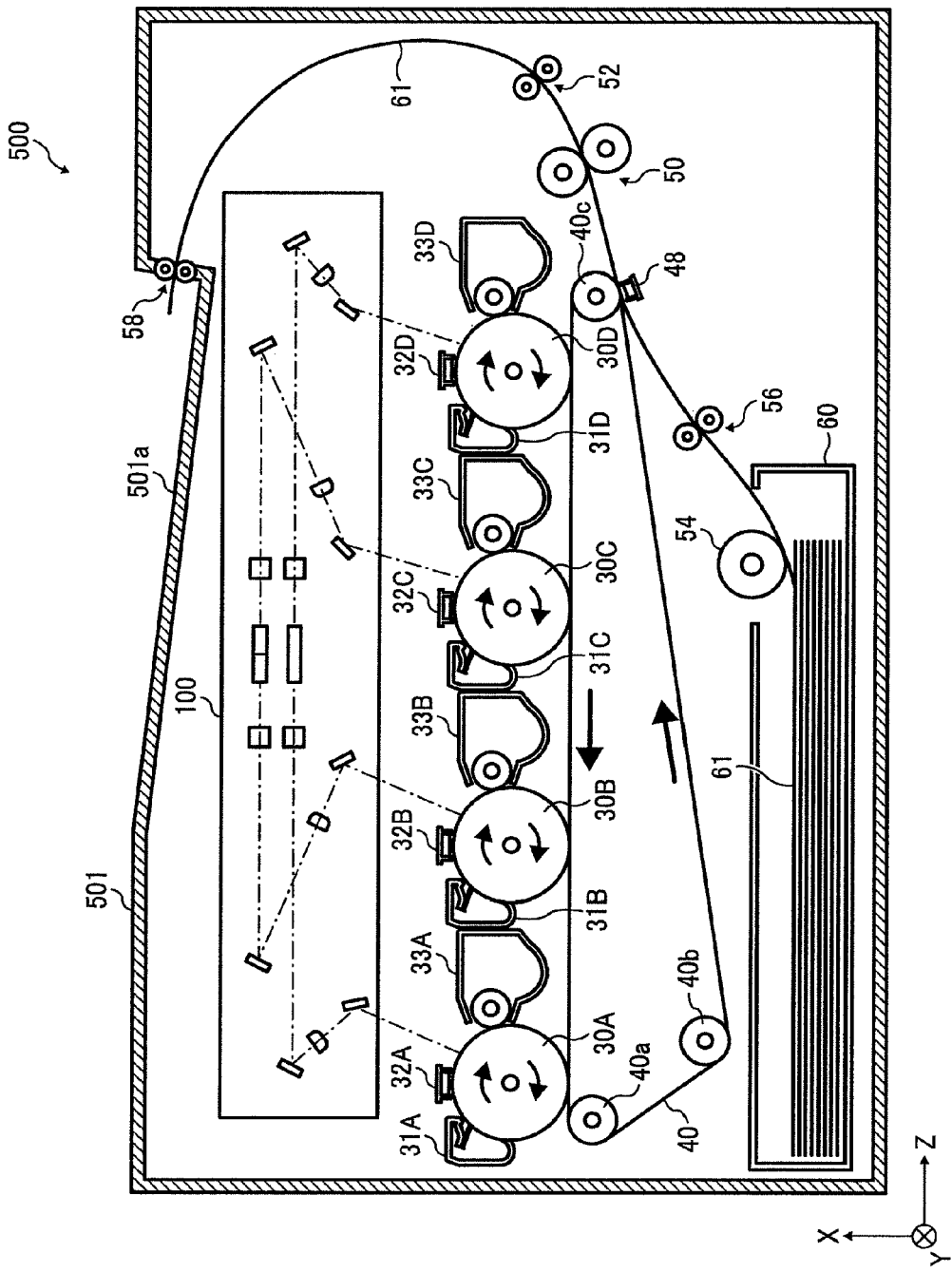
FIG. 1 is a schematic cross-sectional view illustrating the configuration of an image forming apparatus according to an embodiment of the present invention.

FIG. 1 is a schematic cross-sectional diagram illustrating an example configuration of an image forming apparatus 500 according to an embodiment of the present invention.

As illustrated in FIG. 1, the image forming apparatus 500 is a tandem, electrophotographic color printer that produces a print of a multi-color image by transferring, for example, black, yellow, magenta, and cyan toner images onto a sheet-like recording medium (also referred to as "sheet") such that the toner images are superimposed on one another. The image forming apparatus 500 includes an optical-beam scanning apparatus 100, four photosensitive drums 30A, 30B, 30C, and 30D, a transfer belt 40, a sheet feed tray 60, a sheet feed roller 54, first registration rollers 56, second registration rollers 52, fixing rollers 50, sheet delivery rollers 58, a control device (not shown) that performs centralized control of the units, and a housing 501 that houses the components.

A sheet output tray 501a, onto which printed sheets are to be delivered, is formed on the top surface of the housing 501. The optical-beam scanning apparatus 100 according to the embodiment is arranged below the sheet output tray 501a.

The optical-beam scanning apparatus 100 scans the photosensitive drum 30A with laser beam modulated with image data for a black image component fed from a host apparatus (personal computer or the like), the photosensitive drum 30B with laser beam for a cyan image component, the photosensitive drum 30C with laser beam for a magenta image component, and the photosensitive drum 30D with laser beam for a yellow image component. The structure of the optical-beam scanning apparatus 100 will be described later.

The photosensitive drums 30A, 30B, 30C, and 30D are cylindrical members each of which includes, on its surface, a photosensitive layer that has such property that a portion of the photosensitive layer irradiated with laser beam becomes conductive and arranged below the optical-beam scanning apparatus 100 equidistantly in the Z-axis direction.

The photosensitive drum 30A is arranged at an interior end portion on the negative Z-side (left-hand side in FIG. 1) of the housing 501 such that the longitudinal axis of the photosensitive drum 30A lies along the Y-axis (the direction orthogonal to the plane of FIG. 1) and driven to rotate clockwise (direction indicated by arrows in FIG. 1) by a rotating mechanism (not shown). An electrifying charger 32A, a toner cartridge 33A, and a cleaning casing 31A are arranged around the photosensitive drum 30A clockwise in this order with the electrifying charger 32A at 12 o'clock position (upper side) in FIG. 1.

The electrifying charger 32A is arranged to have a predetermined clearance from the surface of the photosensitive drum 30A, longitudinally extends in the Y-axis direction, and apples a predetermined voltage to the surface of the photosensitive drum 30A to electrically charge the surface.

The toner cartridge 33A includes a cartridge body filled with toner for a black image component and a developing roller that is electrically charged in the polarity opposite from that of the photosensitive drum 30A, and supplies the toner filled in the cartridge body to the surface of the photosensitive drum 30A via the developing roller.

The cleaning casing 31A includes a substantially rectangular cleaning blade that longitudinally extends in the Y-axis direction and is arranged such that one end of the cleaning blade is brought into contact with the surface of the photosensitive drum 30A. As the photosensitive drum 30A rotates, toner attracted onto the surface of the photosensitive drum 30A is peeled therefrom by the cleaning blade to be recovered into the cleaning casing 31A.

Each of the photosensitive drums 30B, 30C, and 30D has a similar configuration with that of the photosensitive drum 30A and are arranged in order at predetermined intervals on the positive Z-side (right-hand side in FIG. 1) of the photosensitive drum 30A. Each of the electrifying chargers 32B, 32C, and 32D, toner cartridges 33B, 33C, and 33D, and cleaning casings 31B, 31C, and 31D are arranged around a corresponding one of the photosensitive drums 30B, 30C, and 30D in a similar positional relationship with that of the photosensitive drum 30A.

Each of the electrifying chargers 32B to 32D has a similar configuration with that of the electrifying charger 32A and applies a predetermined voltage to the surface of a corresponding one of the photosensitive drums 30B to 30D to electrically charge the surface.

Each of the toner cartridges 33B to 33D includes a cartridge body filled with toner for a corresponding one of cyan, magenta, and yellow image components and a developing roller that is electrically charged in the polarity opposite from that of the photosensitive drums 30B to 30D, and supplies the toner filled in the cartridge body to the surface of a corresponding one of the photosensitive drums 30B to 30D via the developing roller.

Each of the cleaning casings 31B to 31D has a similar configuration and provides similar functions with those of the cleaning casing 31A.

Hereinafter, the photosensitive drum 30A, the electrifying charger 32A, the toner cartridge 33A, and the cleaning casing 31A are collectively referred to as a first station; the photosensitive drum 30B, the electrifying charger 32B, the toner cartridge 33B, and the cleaning casing 31B are collectively referred to as a second station; the photosensitive drum 30C, the electrifying charger 32C, the toner cartridge 33C, and the cleaning casing 31C are collectively referred to as a third station; and the photosensitive drum 30D, the electrifying charger 32D, the toner cartridge 33D, and the cleaning casing 31D are collectively referred to as a fourth station.

The transfer belt 40 is an endless annular member and wound around a driven roller 40a and a driven roller 40c arranged below the photosensitive drum 30A and the photosensitive drum 30D, respectively, and a drive roller 40b arranged at a position slightly lower than the driven rollers 40a and 40c such that the top surface of the transfer belt 40 is in contact with the bottom surfaces of the photosensitive drums 30A, 30B, 300, and 30D. As the drive roller 40b rotates counterclockwise in FIG. 1, the transfer belt 40 is driven to rotate counterclockwise (direction indicated by arrows in FIG. 1). A transfer charger 48, onto which a voltage in the opposite polarity to that applied to the electrifying charger 32A, 32B, 32C, and 32D is applied, is arranged near an end portion on the positive Z-side of the transfer belt 40.

The sheet feed tray 60 is arranged below the transfer belt 40. The sheet feed tray 60 is a substantially rectangular parallelepiped tray that houses a plurality of stacked sheets 61 that are to be subjected to printing. A rectangular sheet feed port is defined in the top surface of the sheet feed tray 60 at a position near a positive Z-side end.

The sheet feed roller 54 picks up one of the sheets 61 at one time from the sheet feed tray 60 and delivers the sheet 61 through the first registration rollers 56, which include a pair of rotating rollers, into a clearance between the transfer belt 40 and the transfer charger 48.

The fixing rollers 50 include a pair of rotating rollers, impart heat and pressure to the sheet 61, and deliver the sheet 61 to the sheet delivery rollers 58 by way of the second registration rollers 52.

The sheet delivery rollers 58 include a pair of rotating rollers and cause the thus-delivered sheets 61 to be sequentially stacked on the sheet output tray 501a.

The configuration of the optical-beam scanning apparatus according to an embodiment of the present invention will be described below.

Figure 2:
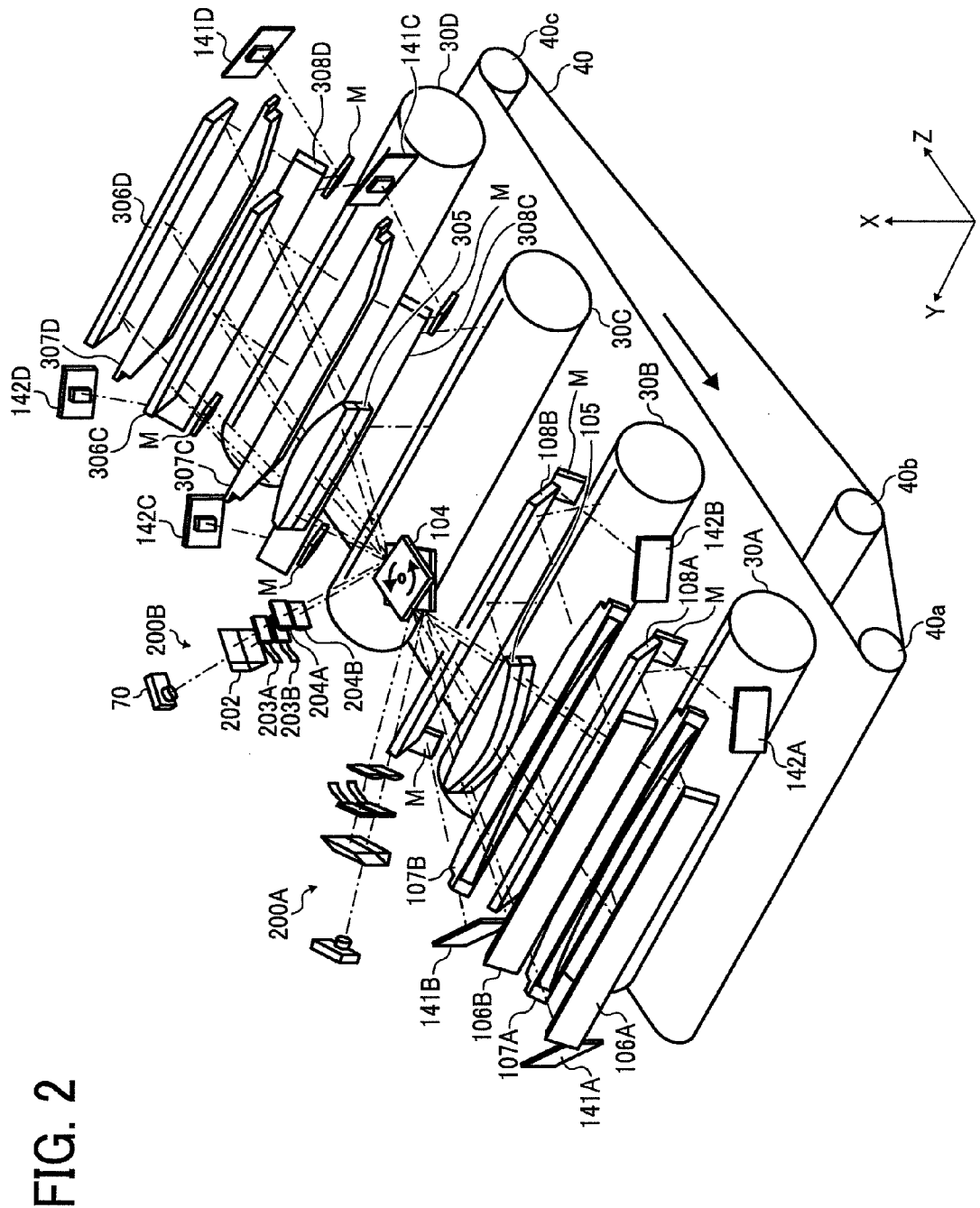
FIG. 2 is a schematic perspective view illustrating the configuration of an optical-beam scanning apparatus according to the embodiment.
Figure 3:
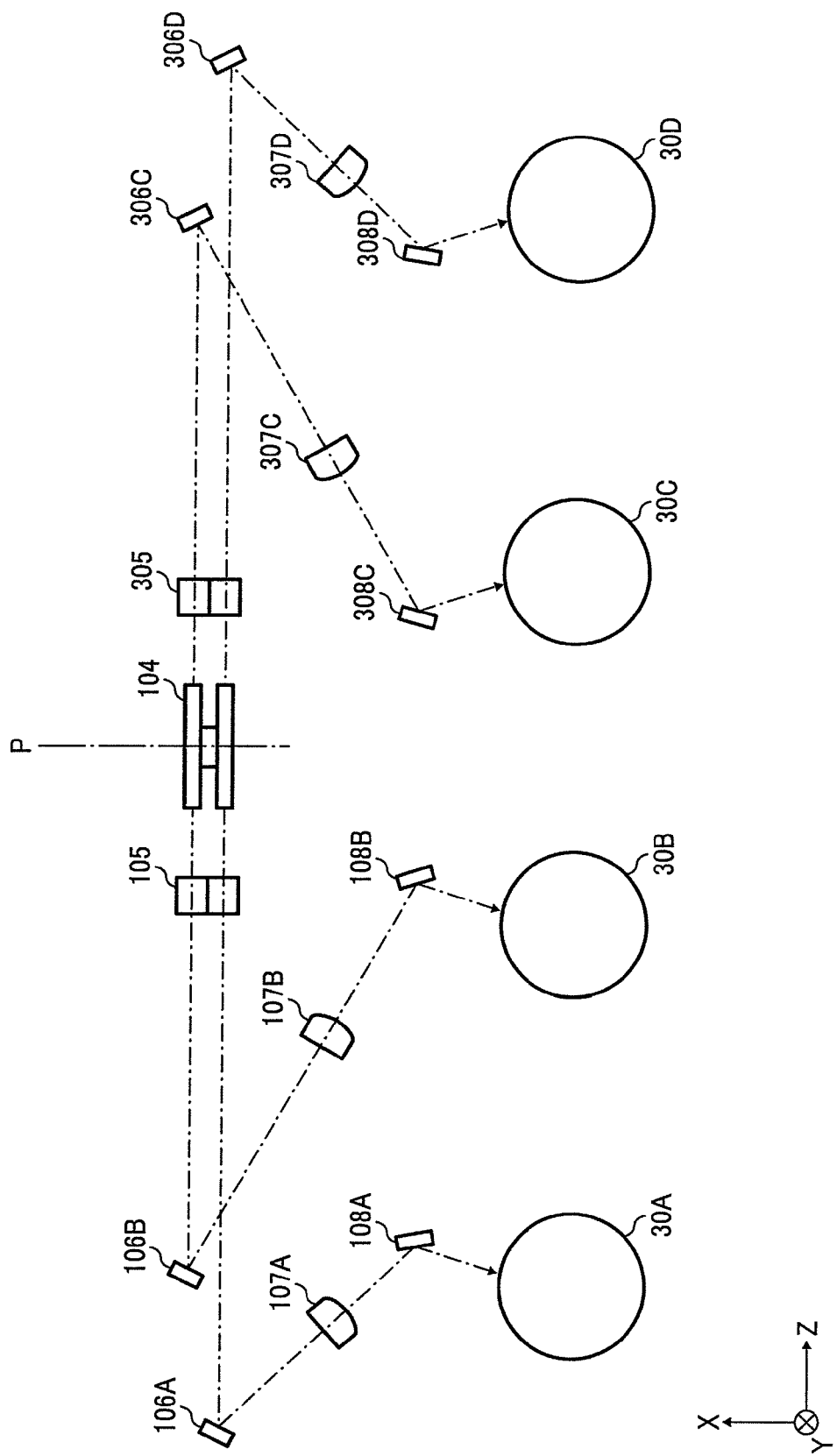
FIG. 3 is a schematic cross-sectional view illustrating the configuration of the optical-beam scanning apparatus according to an embodiment.

FIG. 2 is a schematic perspective view illustrating the configuration of the optical-beam scanning apparatus 100. FIG. 3 is a schematic cross-sectional view illustrating the configuration of the optical-beam scanning apparatus 100. Referring to FIGS. 2 and 3 together, the optical-beam scanning apparatus 100 includes a scanning optical system that includes a polygon mirror 104, an fθ lens 105, a reflection mirror 106B, and a reflection mirror 106A that are arranged in this order relative to the polygon mirror 104 in the negative Z-direction, a reflection mirror 108B arranged below the fθ lens 105, a toroidal lens 107B, a reflection mirror 108A, and a toroidal lens 107A that are arranged in this order relative to the reflection mirror 108B in the negative Z-direction, an fθ lens 305, a reflection mirror 306C, and a reflection mirror 306D that are arranged in this order relative to the polygon mirror 104 in the positive Z-direction, a reflection mirror 308C arranged below the fθ lens 305, a toroidal lens 307C, a reflection mirror 308D, and a toroidal lens 307D that are arranged in this order relative to the reflection mirror 308C in the positive Z direction, and two optical systems that includes an optical system 200A for causing an optical beam (laser beam) for use in scanning of the photosensitive drums 30A and 30B to impinge on the polygon mirror 104, and an optical system 200B for causing an optical beam (laser beam) for use in scanning the photosensitive drums 30C and 30D to impinge on the polygon mirror 104.

Each of the optical systems 200A and 200B is an optical system that causes a laser beam to impinge on deflection surfaces of the polygon mirror 104 in a direction at 120 degrees or 60 degrees relative to the Z-axis, and includes, as illustrated in FIG. 2 where the optical system 200B is representatively depicted, in addition to a light source apparatus 70, a light-flux splitting prism 202, a pair of liquid crystal devices 203A and 203B, and a pair of cylindrical lenses 204A and 204B that are arranged in this order along a passage of laser beams emitted from the light source apparatus 70. The light source apparatus 70 will be described in detail later.

The light-flux splitting prism 202 splits an incident laser beam into two laser beams that are vertically (in the sub-scanning direction) separated from each other by a predetermined distance.

The liquid crystal devices 203A and 203B are arranged to be vertically adjacent to each other such that each of the liquid crystal devices 203A and 203B receives a corresponding one of the two laser beams split by the light-flux splitting prism 202 and deflects the incident laser beam in the sub-scanning direction according to a voltage signal fed from the control device (not shown).

The cylindrical lenses 204A and 204B are arranged to be vertically adjacent to each other such that each of the cylindrical lenses 204A and 204B receives a corresponding one of the two laser beams split by the light-flux splitting prism 202 and condenses the incident laser beam at the polygon mirror 104. Each of the cylindrical lenses 204A and 204B has, at least in the sub-scanning direction, a positive curvature, and the cylindrical lenses 204A and 204B and the toroidal lenses 107A to 107D form an optical-face-angle-error-correcting optical system, in which a deflection point on the polygon mirror 104 and the surfaces of the photosensitive drums 30A to 30D are in conjugate relation in the sub-scanning direction.

The polygon mirror 104 includes a pair of regular square pole members that have side surfaces, on which laser-beam deflection surfaces are formed and which are arranged to have phase difference by 45 degrees and vertically adjacent to each other. The polygon mirror 104 is rotated in the direction indicated by arrows in FIG. 2 at a constant angular velocity by the rotating mechanism (not shown). This configuration causes a laser beam to be split by the light-flux splitting prism 202 of any one of the optical system 200A and the optical system 200B into two laser beams, which are then condensed on the deflection surfaces of the polygon mirror 104 independently, and causes the two laser beams to be deflected by the deflection surfaces of different phases independently so that the two laser beams impinge on the photosensitive drums alternately.

Each of the fθ lenses 105 and 305 has an image height that is proportional to an incident angle of laser beam and causes an image surface of laser beam deflected by the polygon mirror 104 to move at a constant angular velocity relative to the Y-axis.

Each of the reflection mirrors 106A, 106B, 306C, and 306D longitudinally extends in the Y-axis direction and reflects a laser beam traveled through a corresponding one of the fθ lenses 105 and 305 to enter a corresponding one of the toroidal lenses 107A, 107B, 307C, and 307D.

Each of the toroidal lenses 107A, 107B, 307C, and 307D is arranged so as to longitudinally extend in the Y-axis direction and causes a laser beam reflected from a corresponding one of the reflection mirrors 106A, 106B, 306C, and 306D to form an image on the surface of a corresponding one of the photosensitive drums 30A, 30B, 30C, and 30D by way of a corresponding one of the reflection mirrors 108A, 108B, 308C, and 308D that longitudinally extends in the Y-axis direction.

An optical detection sensor 141A and an optical detection sensor 141B are arranged near an end portion of the toroidal lens 107A and near an end portion of the toroidal lens 107B on the positive Y-side (on the side where laser beam is incident), respectively; and an optical detection sensor 141C and an optical detection sensor 141D are arranged near an end portion of the toroidal lens 307C and near an end portion of the toroidal lens 307D on the negative Y-side (on the side where laser beam is incident), respectively. An optical detection sensor 142A and an optical detection sensor 142B are arranged near a negative Y-side end portion of the toroidal lens 107A and near a negative Y-side end portion of the toroidal lens 107B, respectively; and an optical detection sensor 142C and an optical detection sensor 142D are arranged near a positive Y-side end portion of the toroidal lens 307C and near a positive Y-side end portion of the toroidal lens 307D, respectively. Each of the optical detection sensors 141A to 141D and 142A to 142D outputs, for example, a signal indicative of ON while a laser beam is incident and a signal indicative of OFF at all other times.

How the image forming apparatus 500 that includes the optical-beam scanning apparatus 100 configured as mentioned earlier operates will be described below.

Upon receipt of image data from a host apparatus, a laser beam emitted from the light source apparatus 70 is vertically split into two by the light-flux splitting prism 202 in the optical system 200A. Each of the thus-split laser beams is corrected in position in the sub-scanning direction by passing through a corresponding one of the liquid crystal devices 203A and 203B and thereafter focused, by the one of the cylindrical lenses 204A and 204B, onto a corresponding one of the deflection surfaces of the polygon mirror 104. The laser beam deflected by the polygon mirror 104 is incident on the fθ lens 105.

An upper one of the laser beams that has passed through the fθ lens 105 is reflected from the reflection mirror 106B and incident on the toroidal lens 107B. The toroidal lens 107B causes the laser beam to condense on the surface of the photosensitive drum 30B by way of the reflection mirror 108B. A lower one of the laser beams that has passed through the fθ lens 105 is reflected from the reflection mirror 106A and incident on the toroidal lens 107A. The toroidal lens 107A causes the laser beam to condense on the surface of the photosensitive drum 30A by way of the reflection mirror 108A. As mentioned earlier, an upper one and a lower one of the deflection surfaces of the polygon mirror 104 have phases that differ by 45 degrees from each other. Accordingly, scanning of the photosensitive drum 30B with the upper laser beam and scanning of the photosensitive drum 30A with the lower laser beam are alternately performed in the negative Y-direction according to signals output from the optical detection sensors 141A, 141B, 142A, and 142B independently.

A laser beam emitted from the light source apparatus 70 is vertically split into two by the light-flux splitting prism 202 in the optical system 200B. Each of the thus-split laser beams is corrected in position in the sub-scanning direction by passing through a corresponding one of the liquid crystal devices 203A and 203B and thereafter focused, by a corresponding one of the cylindrical lenses 204A and 204B, on one of the deflection surfaces of the polygon mirror 104. The laser beam deflected by the polygon mirror 104 is incident on the fθ lens 305.

An upper one of the laser beams that has passed through the fθ lens 305 is reflected from the reflection mirror 306C and incident on the toroidal lens 307C. The toroidal lens 307C causes the laser beam to condense on the surface of the photosensitive drum 30C by way of the reflection mirror 308C. A lower one of the laser beams that has passed through the fθ lens 305 is reflected from the reflection mirror 306D and incident on the toroidal lens 307D. The toroidal lens 307D causes the laser beam to condense on the surface of the photosensitive drum 30D by way of the reflection mirror 308D. As mentioned earlier, an upper one and a lower one of the deflection surfaces of the polygon mirror 104 have phases that differ by 45 degrees from each other. Accordingly, scanning of the photosensitive drum 30C with the upper laser beam and scanning of the photosensitive drum 30D with the lower laser beam are alternately performed in the positive Y-direction according to signals output from the optical detection sensors 141C, 141D, 142C, and 142D independently.

In this scanning, laser beams of which intensity has been adjusted in advance to a predetermined level impinge on write areas of the photosensitive drums 30A to 30D from the light source apparatus 70.

Photosensitive layers on the surfaces of the photosensitive drums 30A, 30B, 30C, and 30D are electrically charged under application of a predetermined voltage from the electrifying charger 32A, 32B, 32C, and 32D, respectively, and hence bear charges distributed in a predetermined charge density. As mentioned earlier, with the photosensitive drums 30A, 30B, 30C, and 30D having undergone scanning independently, a portion of the photosensitive layer where laser beam has impinged becomes conductive, bringing potential at the portion to substantially zero. Accordingly, by scanning the photosensitive drums 30A, 30B, 30C, and 30D rotating in the direction indicated by arrows in FIG. 1 independently with the laser beams modulated with image data, an electrostatic latent image is formed according to distribution of the electric charges on the surface of each of the photosensitive drums 30A, 30B, 30C, and 30D.

When an electrostatic latent image is thus formed on the surface of each of the photosensitive drums 30A, 30B, 30C, and 30D, toner is supplied to the surface of each of the photosensitive drums 30A, 30B, 30C, and 30D by the developing roller of a corresponding one of the toner cartridge 33A, 33B, 33C, and 33D depicted in FIG. 1. Because the developing rollers of the toner cartridge 33A, 33B, 33C, and 33D are electrically charged in the polarity opposite from that of the photosensitive drums 30A, 30B, 30C, and 30D in this state, the toner sticking to the developing rollers are electrically charged in the same polarity as that of the photosensitive drums 30A, 30B, 30C, and 30D. Accordingly, toner does not stick to portions on the surfaces of the photosensitive drums 30A, 30B, 30C, and 30D that carry electric charges but sticks to only scanned portions, thereby forming a visible toner image of the electrostatic latent image on the surface of each of the photosensitive drums 30A, 30B, 30C, and 30D.

As mentioned earlier, the toner images formed by the first station, the second station, the third station, and the fourth station according to the image data are transferred onto the surface of the transfer belt 40 to be superimposed on one another, transferred by the transfer charger 48 onto the surface of the sheet 61 fed from the sheet feed tray 60, and fixed onto the surface of the sheet 61 by the fixing rollers 50. The sheet 61, on which the image is thus formed, is delivered by the sheet delivery rollers 58 and stacked on the sheet output tray 501a one after another.

A light source apparatus 70 according to an embodiment of the present invention will be described below.

Figure 4:
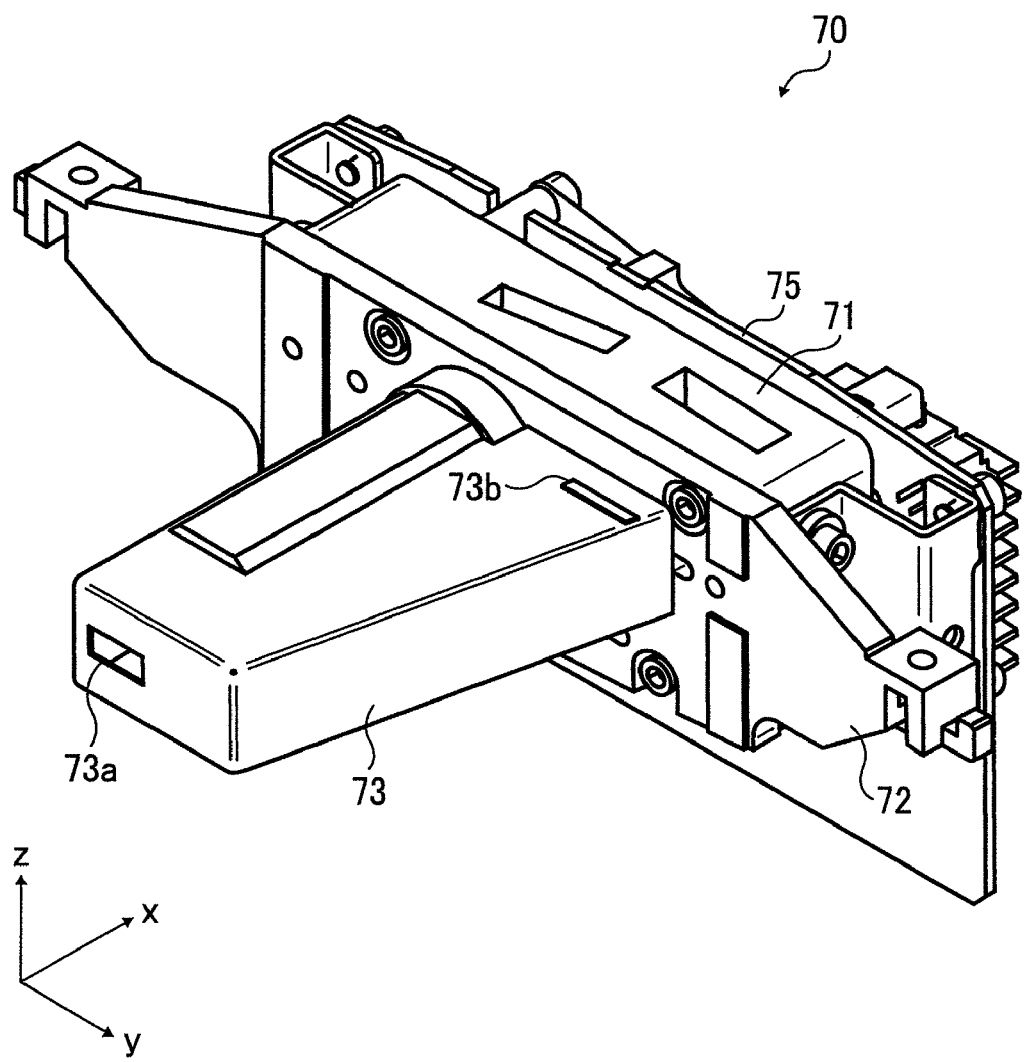
FIG. 4 is a schematic perspective view illustrating the configuration of a light source apparatus according to the embodiment.
Figure 5A:
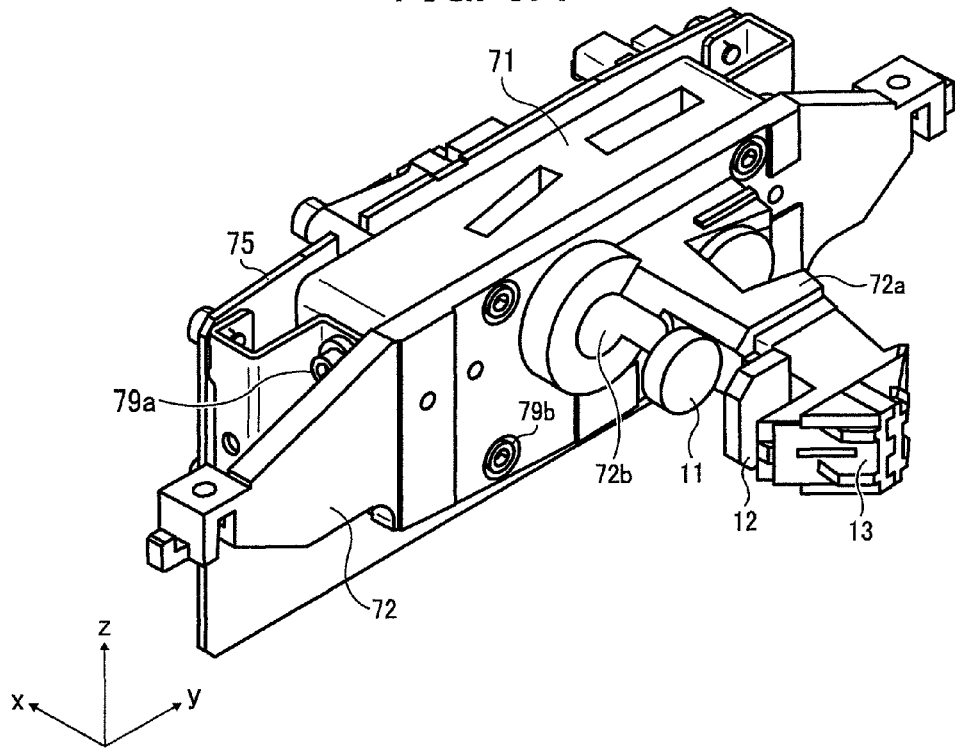
FIGS. 5A and 5B are schematic perspective views illustrating the configuration of the light source apparatus illustrated in FIG. 4 with a protection cover removed.
Figure 5B:
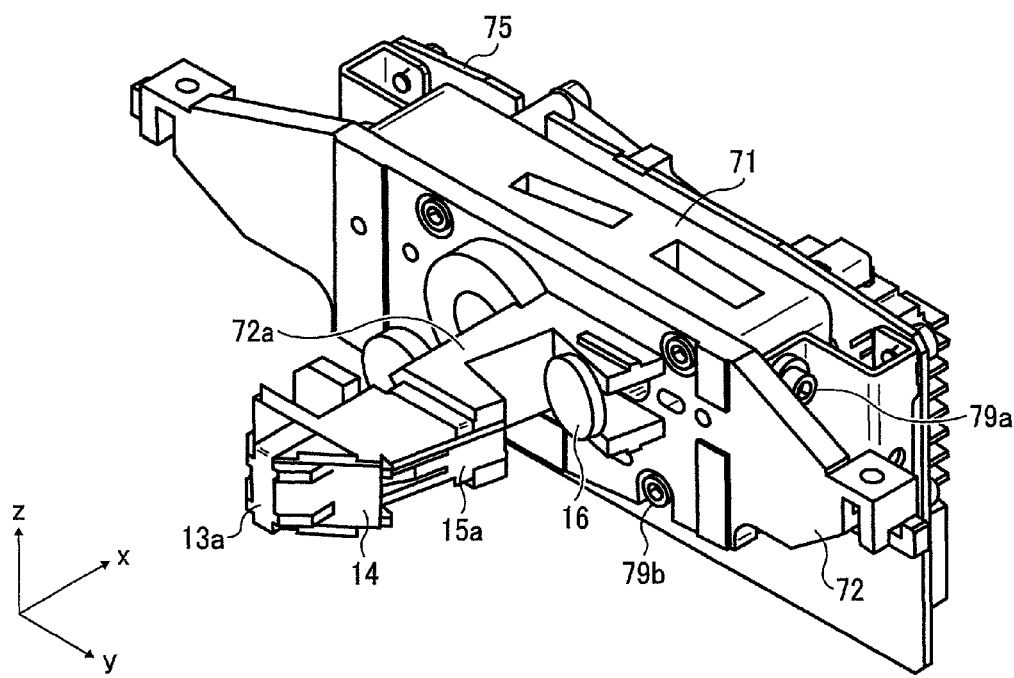

FIG. 4 is a schematic perspective exterior view of the light source apparatus 70. FIGS. 5A and 5B are schematic perspective views illustrating layout of optical elements 11, 12, 13, 14, 16, and the like with a protection cover 73 removed from the light source apparatus 70. FIG. 5A is a view of the light source apparatus 70 as viewed from an upper left position relative to a front view, and FIG. 5B is a view of the same as viewed from an upper right position relative to the front view.

The light source apparatus 70 includes a circuit board (circuit board 75), on which a light source unit (light source unit 10) that includes a vertical-cavity surface-emitting light source (vertical-cavity surface-emitting light source 10a) that includes a plurality of light sources (vertical-cavity surface-emitting lasers (VCSELs)) arranged in a two-dimensional array (monolithic) on a plane orthogonal to the optical axis (direction in which optical beam is emitted) and a package (package 10b) that houses the vertical-cavity surface-emitting light source therein is mounted, an optical element holder (optical element holder 72) that holds a plurality of optical elements (the coupling lens 11, the temperature correction lens 12, and the aperture mirror 13) that includes at least the coupling lens that converges and diverges an optical beam emitted from the light source unit to be any one of parallel light flux and light flux of any one of predetermined convergence and predetermined divergence, and an intermediate holder (intermediate holder 71). The intermediate holder 71 is arranged between the circuit board and the optical element holder, joined to the circuit board so as to cover the surface of the circuit board where the light source unit is mounted to thereby come into contact with the package and fix the circuit board while positioning the vertical-cavity surface-emitting light source relative to the light source apparatus, and joined to the optical element to thereby position the optical elements relative to the vertical-cavity surface-emitting light source.

The coupling lens 11 is arranged in a coupling-lens receiving portion 72a1 (which will be described later) of an optical element retainer 72a of the optical element holder 72. The coupling lens 11 is, for example, a single-element lens with a refractive index of approximately 1.5 and a focal point on the negative x-side and shapes an incident optical beam (also referred to as "laser beam") from the light source unit 10 into substantially parallel light by changing divergence angle of the optical beam. Alternatively, the coupling lens 11 converges and diverges the optical beam into light flux of predetermined convergence or divergence.

The temperature correction lens 12 is arranged in a temperature-correcting-lens receiving portion 72a2 (which will be described later) of the optical element retainer 72a of the optical element holder 72. The temperature correction lens 12 is a resin lens that is made of transparent resin and has a rectangular plate-like shape, of which longer sides extend in the z-axis direction and shorter sides extend in the y-axis direction. This configuration allows the temperature correction lens 12 to be clamped for positional adjustment in the x-axis direction (optical axis direction) when arranged in the optical element retainer 72a. Setting the longer sides of the temperature correction lens 12 to be longer than the width (length in the z-axis direction) of the coupling-lens receiving portion 72a1 facilitates clamping by using an adjustment jig (not shown) and further facilitates the adjustment. The temperature correction lens 12 has such optical characteristic, for example, of compensating fluctuation in optical characteristics of the light source apparatus 70 resulting from minute change in a distance between the coupling lens 11 and the light source unit 10 due to temperature fluctuation of the light source apparatus 70.

The aperture mirror 13 is a tabular member that has a rectangular opening, which is elongated in the y-axis direction, at its center and includes a reflection surface that reflects laser beam on a positive-x-side surface. The center of the opening of the aperture mirror 13 is located at or near the focal point of the coupling lens 11, and the reflection surface of the aperture mirror 13 is located in an aperture-mirror receiving portion 72a3 (which will be described later) of the optical element retainer 72a of the optical element holder 72 with the reflection surface inclined by −45 degrees relative to the xz-plane (rotated by 45 degrees toward the negative y-side).

With the configuration of the optical elements mentioned above, a portion of a laser beam emitted from the light source unit 10 that has passed through the coupling lens 11 and the temperature correction lens 12 passes through the opening of the aperture mirror 13 and the remaining portion of the laser beam is reflected from the reflection surface of the aperture mirror 13 in the positive y-direction so as to enter the front-monitor optical system; hence, the laser beam is divided into write light flux (scanning laser beam) and front-monitor light flux (laser beam for front monitoring).

As depicted in FIG. 5B, the optical element holder 72 holds, as the front-monitor optical system, the reflecting mirror 14, a second aperture 15 (not shown), and the condensing lens 16.

The reflecting mirror 14 is a tabular member that includes a reflection surface that reflects a laser beam on a positive-x-side surface and arranged in a reflecting-mirror receiving portion 72a4 (which will be described later) of the optical element retainer 72a of the optical element holder 72 with the reflection surface inclined by +45 degrees relative to the xz-plane (rotated by 45 degrees toward the positive y-side). The front-monitor laser beams obtained by splitting by the aperture mirror 13 is reflected from the reflecting mirror 14 and directed to return toward the circuit board 75.

The second aperture 15 is an aperture diaphragm member for the front-monitor laser beam and arranged between the reflecting mirror 14 and the condensing mirror 16. The condensing lens 16 is a planoconvex, single-element lens arranged in a condensing-lens receiving portion 72a6 (which will be described later) of the optical element retainer 72a of the optical element holder 72. The second aperture 15 and the condensing lens 16 limit the amount of the front-monitor laser beam that is reflected from the reflecting mirror 14 and directed to return toward the circuit board 75 such that the front-monitor beam has a predetermined beam diameter on a photodetector (PD) 17 mounted on the circuit board 75.

The light source apparatus 70 controls amount of a laser beam emitted from the light source unit 10 by constantly monitoring a signal output upon incidence of a front-monitor laser beam on the PD 17. Specifically, in the optical-beam scanning apparatus 100, the front-monitor laser beam is detected by the PD 17 during the course where the laser beam travels from the deflection surface of the polygon mirror 104, by which the laser beam is deflected, to the write area on the photosensitive drum. The light source apparatus 70 detects intensity of the laser beam emitted from the light source unit 10 based on a photoelectric signal output from the PD 17 upon receipt of the front-monitor laser beam and sets (determines) a level of injection electrical power to be supplied to each of the VCSELs of the vertical-cavity surface-emitting light source 10a so that intensity of laser beams emitted from the light source unit 10 attains a predetermined value. With this configuration, laser beams whose intensity has been adjusted to the predetermined level impinge on the write areas of the photosensitive drums 30A to 30D.

Figure 6:
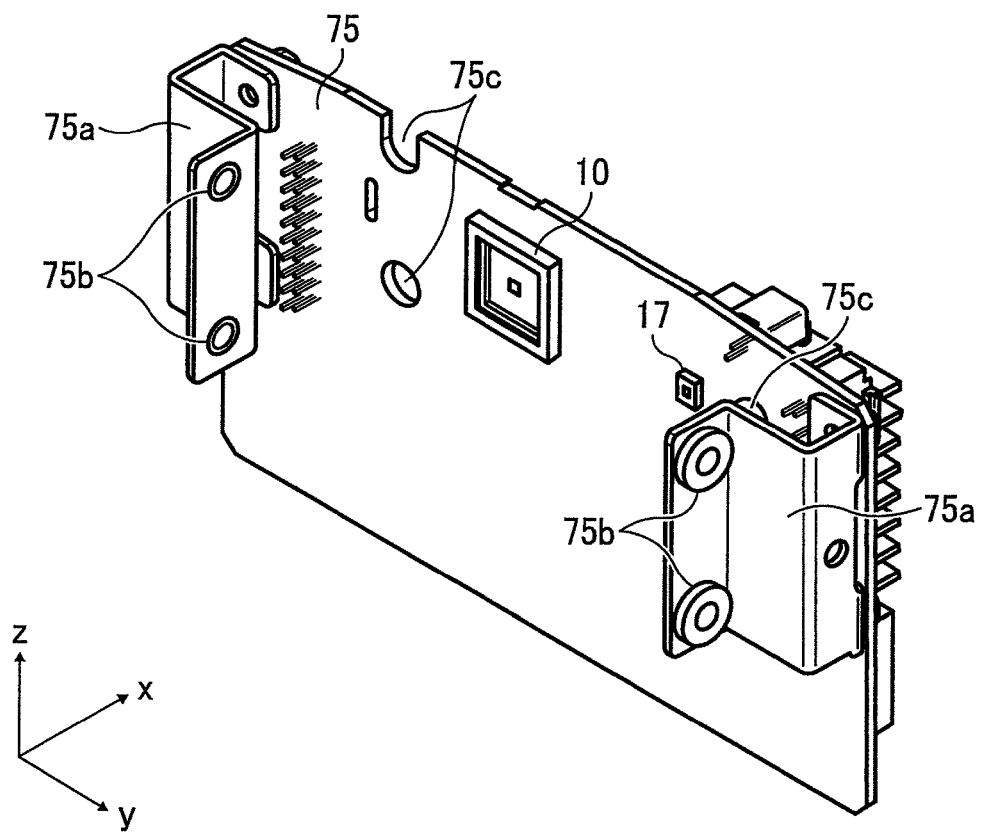
FIG. 6 is a schematic perspective view illustrating the configuration of a circuit board.

FIG. 6 is a schematic perspective view of the circuit board 75 as viewed from the front (negative x-side) of the light source apparatus 70.

The circuit board 75 is a board whose longer sides extend in the y-axis direction and includes a negative-x-side surface and a positive-x-side surface. The light source unit 10 and the PD 17 are mounted on the negative-x-side surface and a drive circuit that drives the light source unit 10 and the like are formed on the positive-x-side surface.

A pair of reinforcing members 75a, each of which is formed of metal sheet and has two holes at predetermined positions, is arranged on longitudinal opposite ends of the negative-x-side surface of the circuit board 75. An intermediate member 75b that is a stepped collar made of resin and has a predetermined hole diameter is fit into each of the holes of reinforcing members 75a. By tightening fastening screws 79a in a state that fixation holes 71c, which will be described later, of the intermediate holder 71 are aligned to the positions of the holes in the intermediate members 75b and the intermediate holder 71 is held between the reinforcing members 75a, the intermediate holder 71 is joined to the circuit board 75 with the intermediate holder 71 located at a predetermined position.

The circuit board 75 is made of resin such as epoxy glass; the reinforcing members 75a are made of iron; and the intermediate holder 71 is made of aluminum. When structural members that have different coefficients of linear expansion and therefore expand and shrink in different amounts in response to changes in environmental temperature are screwed, deformation, such as warpage, appears on the structural members. The coefficients of linear expansion of the components decrease in the following order: aluminum>iron>and epoxy glass. It is ascertained in computer simulation that screwing the components directly together rather than interposing the intermediate member 75b therebetween causes warpage of dozens of micromillimeters to appear on the circuit board 75 in an operating environmental temperature range due to the differences in coefficients of linear expansion. This results in positional fluctuation of light-emitting points of the light source unit 10, causing beam diameter to degrade or scanning pitch to vary, which has been a large technical disadvantage.

In the present embodiment, to this end, the fastening screws 79a are tightened with certain amount of play for loose fit (radial clearance) in the holes of the intermediate member 75b. This causes slip among the components to occur without causing a positional change in the optical axis direction (the x-axis direction) and without inhibiting expansion and shrinkage of the circuit board 75, the reinforcing member 75a, or the intermediate holder 71 in the main-scanning direction (the y-axis direction) and the sub-scanning direction (the z-axis direction), thereby minimizing fluctuation of the light-emitting points of the VCSELs of the light source unit 10.

When the light source apparatus 70 is assembled to a housing of the optical-beam scanning apparatus 100 or maintenance of the light source apparatus 70 is performed, the circuit board 75 can receive a stress by an operation of connecting or disconnecting a connector to or from the circuit board 75; however, according to the present embodiment, because the circuit board 75 and the intermediate holder 71 are fastened together reliably at more than four fastening positions, positional change of the circuit board 75 is less likely to occur in the light source apparatus 70. This is also highly effective in terms of productivity.

Three relief holes (round holes) 75c, into which cylindrical portions 71f of the intermediate holder 71 are to be inserted, are defined at positions surrounding the light source unit 10 and the PD 17.

Figure 7A:
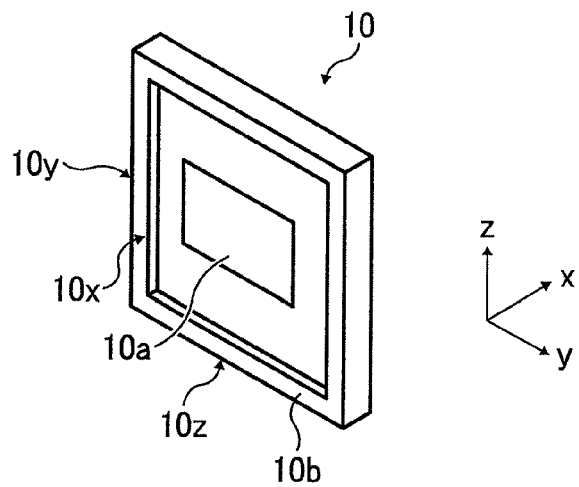
FIGS. 7A and 7B are schematic diagrams illustrating the configuration of a light source unit.

FIG. 7A is a schematic perspective view illustrating the configuration of the light source unit 10 to be mounted on the circuit board 75. As illustrated in FIG. 7A, the light source unit 10 is a vertical-cavity surface-emitting laser array that includes the package 10b, which is substantially a square plate, the vertical-cavity surface-emitting light source 10a, which is a light-emitting device housed in the package 10b, and lead wire terminals (not shown), which are wiring of the vertical-cavity surface-emitting light source 10a.

The package 10b is formed by, for example, attaching to a ceramic box casing, which is U-shaped in cross section taken along the xy-plane and in cross section taken along the xz-plane, a glass plate of a substantially similar size with that of the casing from the negative x-side. With the box casing of the package 10b, a surface that faces in the negative x-direction, at least any one an exterior surface facing in the positive y-direction and that facing in the negative y-direction (in FIG. 7A, the exterior surface facing the negative y-side), and at least any one of an exterior surface facing in the positive z-direction and that facing the negative z-direction (in FIG. 7A, the exterior surface that faces the negative z-side) are configured as a surface precisely orthogonal to the x-axis, a surface precisely orthogonal to the z-axis, and a surface precisely orthogonal to the z-axis, respectively, and referred to as an optical-axis-direction reference surface 10x, a main-scanning-direction reference surface 10y, and a sub-scanning-direction reference surface 10z, respectively. Note that the box casing of the package 10b is filled with inert gas.

Figure 7B:
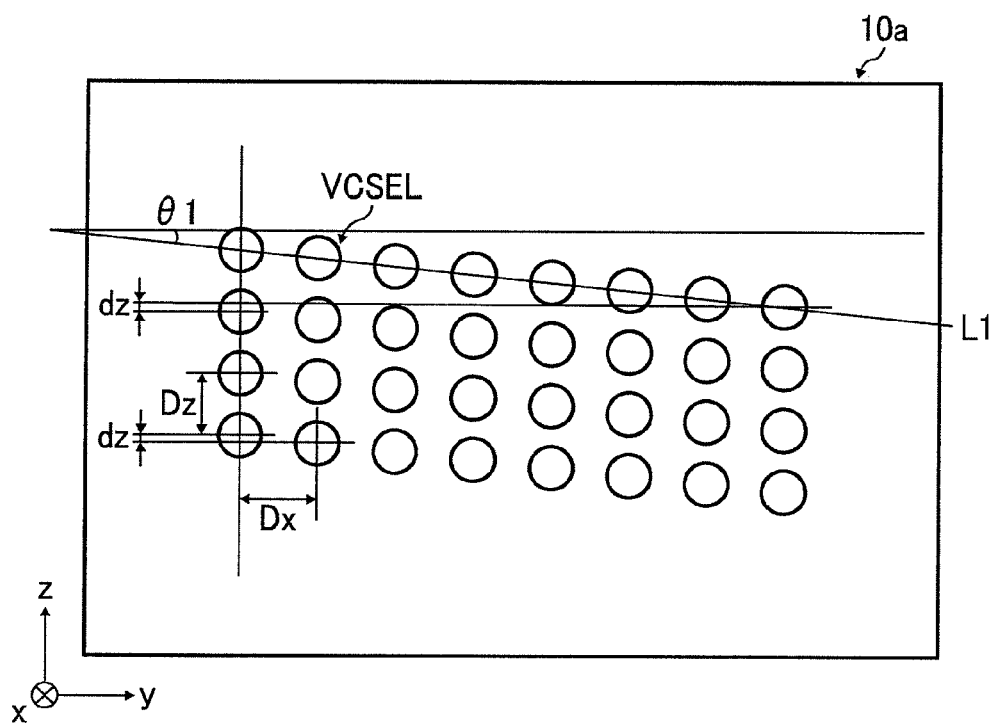

The vertical-cavity surface-emitting light source 10a is a device that includes a light-emitting surface, on which the plurality of light-emitting sources (VCSELs) are two-dimensionally arranged on a plane orthogonal to the optical axis (direction in which optical beams are to be emitted). As illustrated in FIG. 7B, 32 VCSELs that emit diverging optical beams in the negative x-direction are arranged in a matrix with 4 rows by 8 columns on the light-emitting surface (the surface on the negative x-side) of the vertical-cavity surface-emitting light source 10a, where the direction of rows is parallel to a straight line L1 that extends at an angle θ1 with the y-axis and the direction of column is parallel to the z-axis. In the present embodiment, for example, a pitch Dz of the VCSELs in the sub-scanning direction is set to 18.4 μm, a pitch Dy in the main-scanning direction is set to 30 μm, and a pitch dz between adjacent two of the light sources, or the VCSELs, in the z-axis direction (sub-scanning direction) is set to 2.3 μm (=Dz/8). The vertical-cavity surface-emitting light source 10a is housed with the light-emitting surface parallel to the negative-x-side surface of the package 10b and with the lead wire terminals housed in the package 10b.

Figure 8:
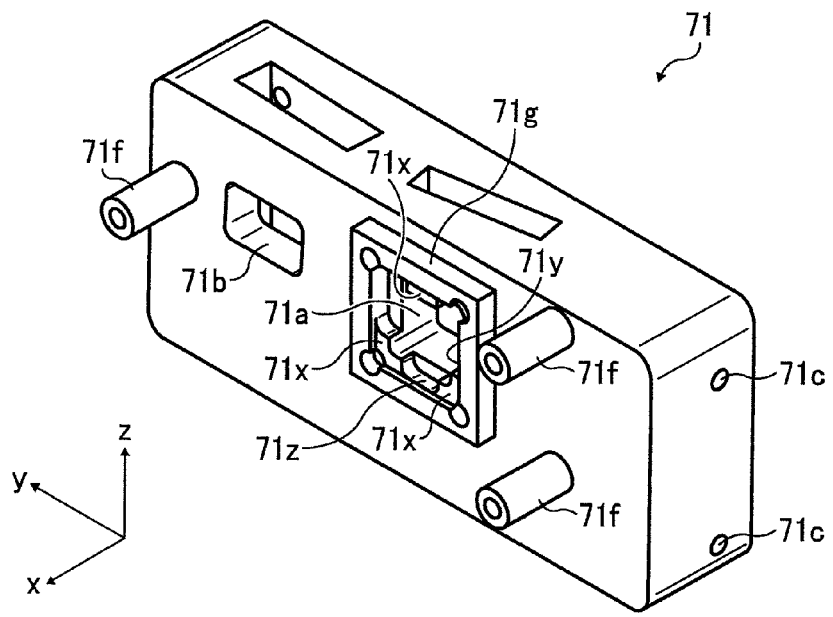
FIG. 8 is a first schematic perspective view illustrating the configuration of an intermediate holder.

FIG. 8 is a schematic perspective view of the intermediate holder 71 as viewed from the positive x-side.

The intermediate holder 71 is a rectangular-solid-like member made from metal, such as aluminum, and has openings 71a and 71b perforated in the x-axis direction. The opening 71a allows optical beam (laser beam) emitted from the light source unit 10 to pass therethrough; and the opening 71b allows optical beam (laser beam) that has returned by being guided by the front-monitor optical system to pass therethrough.

On the positive-x-side surface of the intermediate holder 71, a frame-like projecting portion (frame portion 71g) of a size that allows the package 10b to be inserted thereinto and housed therein is provided on the rim of the opening 71a. Of the frame portion 71g, a surface facing in the positive x-direction (a portion of the negative-x-side surface of the intermediate holder 71), at least any one of an interior surface in the positive y-direction and that in the negative y-direction (in FIG. 8, the interior surface on the negative y-side), and at least any one of an interior surface in the positive z-direction and that in the negative z-direction (in FIG. 8, the interior surface on the negative z-side) are configured as a surface precisely orthogonal to the x-axis, a surface precisely orthogonal to the z-axis, and a surface precisely orthogonal to the z-axis, respectively, and referred to as an optical-axis-direction abutment (receiving portion) 71x, a main-scanning-direction abutment (receiving portion) 71y, and a sub-scanning-direction abutment 71z, respectively. Three cylindrical portions 71f stand upright so as to surround the opening 71a on the positive-x-side surface of the intermediate holder 71.

Two fixation holes 71c, through which the intermediate holder 71 is to be joined to the circuit board 75 with the reinforcing member 75a and the intermediate member 75b therebetween, are defined in each of opposite longitudinal side surfaces of the intermediate holder 71.

The procedure for joining the intermediate holder 71 and the circuit board 75 together will be described below.

First, the intermediate support 71 is positioned relative to the circuit board 75 such that the package 10b of the light source unit 70 on the side of the circuit board 75 can be inserted into and housed in the frame portion 71g of the intermediate support 71. Subsequently, the optical-axis-direction reference surface 10x, the main-scanning-direction reference surface 10y, and the sub-scanning-direction reference surface 10z of the package 10b are brought into contact with the optical-axis-direction abutment (receiving portion) 71x, the main-scanning-direction abutment (receiving portion) 71y, and the sub-scanning-direction abutment 71z of the frame portion 71g, respectively. By this abutment, the intermediate holder 71 and the vertical-cavity surface-emitting light source 10a of the light source unit 10 are located to have a fixed positional relationship; put another way, the vertical-cavity surface-emitting light source 10a is located at a fixed position in the light source unit 70. In this state, the fixation holes 71c of the intermediate holder 71 are aligned to the holes of the intermediate member 75b. Therefore, fixing the intermediate holder 71 to the reinforcing member 75a with the intermediate member 75b therebetween by tightening the fastening screw 79a causes the intermediate holder 71 and the circuit board 75 to be joined together in the positioned state (FIGS. 5A and 5B).

A pressing member 78 for applying pressure to the package 10b on the surface (the positive-x-side surface) opposite from the surface (the negative-x-side surface) where the light source unit 10 of the circuit board 75 is mounted toward the intermediate holder 71 (toward the negative x-side) with the circuit board 75 therebetween is preferably provided.

Figure 9:
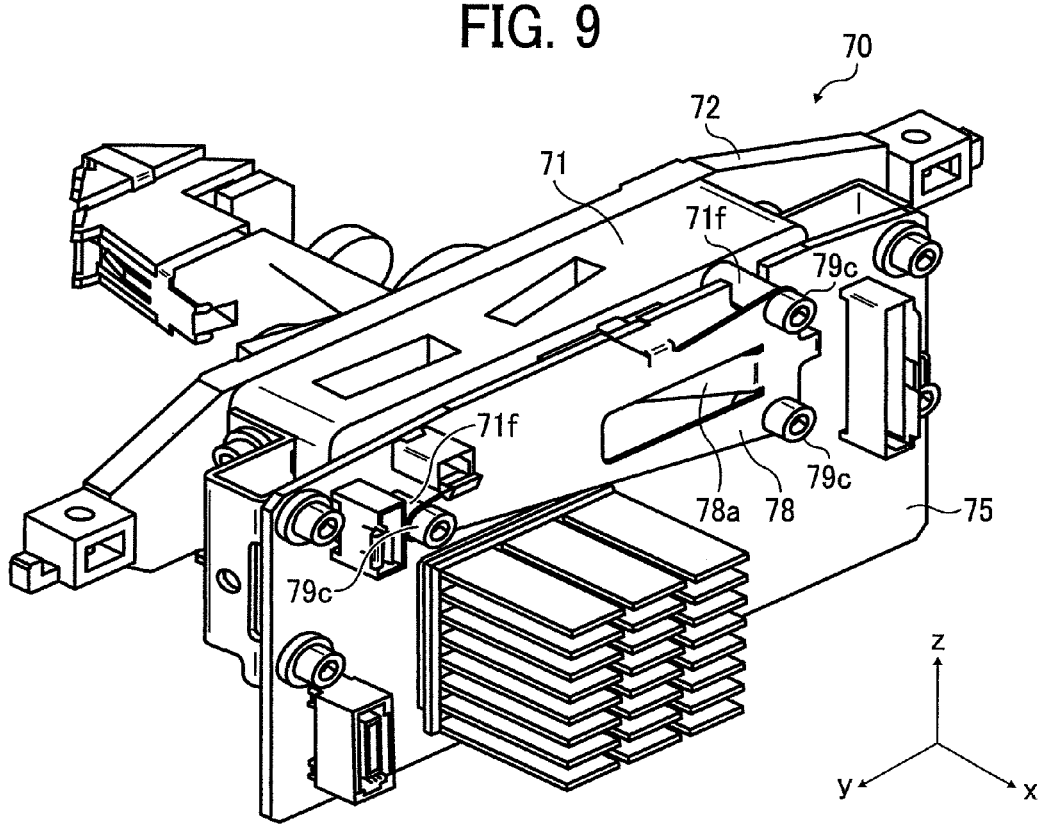
FIG. 9 is a schematic perspective view illustrating the configuration of the backside of the light source apparatus according to the embodiment.

FIG. 9 illustrates a configuration of this example.

Positioning the intermediate support 71 relative to the circuit board 75 such that the package 10b of the optical unit 10 can be inserted into and housed in the frame portion 71g of the intermediate holder 71 causes each of the three cylindrical portions 71f of the intermediate holder 71 to pass through a corresponding one of the relief holes 75c of the circuit board 75 and project out of the surface (the positive-x-side surface) opposite from the surface (the negative-x-side surface) where the light source unit 10 of the circuit board 75 is mounted. By screwing fastening screws 79c into the cylindrical portions 71f through round holes defined in the pressing member 78 at its three corner portions, the pressing member 78 is fixed to the intermediate holder 71 such that the pressing member 78 is positioned on the back side (the positive x-side) of the position where the light source unit 10 of the circuit board 75 is mounted.

The pressing member 78 is formed of, for example, resilient metal sheet and includes a pressing portion 78a that exerts elastic force in the negative x-direction portion. When the pressing member 78 is fixed to the intermediate holder 71 as illustrated in FIG. 9, the circuit board 75 is pressed by the pressing portion 78a of the pressing member 78 toward the intermediate holder 71, bringing the optical-axis-direction reference surface 10x, the main-scanning-direction reference surface 10y, and the sub-scanning-direction reference surface 10z of the package 10b of the light source unit 10 into press contact with the optical-axis-direction abutment (receiving portion) 71x, the main-scanning-direction abutment (receiving portion) 71y, and the sub-scanning-direction abutment 71z on the frame portion 71g of the intermediate holder 71. As a result, the vertical-cavity surface-emitting light source 10a is held in the positioned state without placing a stress on the circuit board 75. This prevents development of component defect on the circuit board 75, thereby increasing reliability of image quality.

In the state where the intermediate holder 71 and the circuit board 75 are joined to each other, the opening 71b faces the PD 17.

Figure 10:
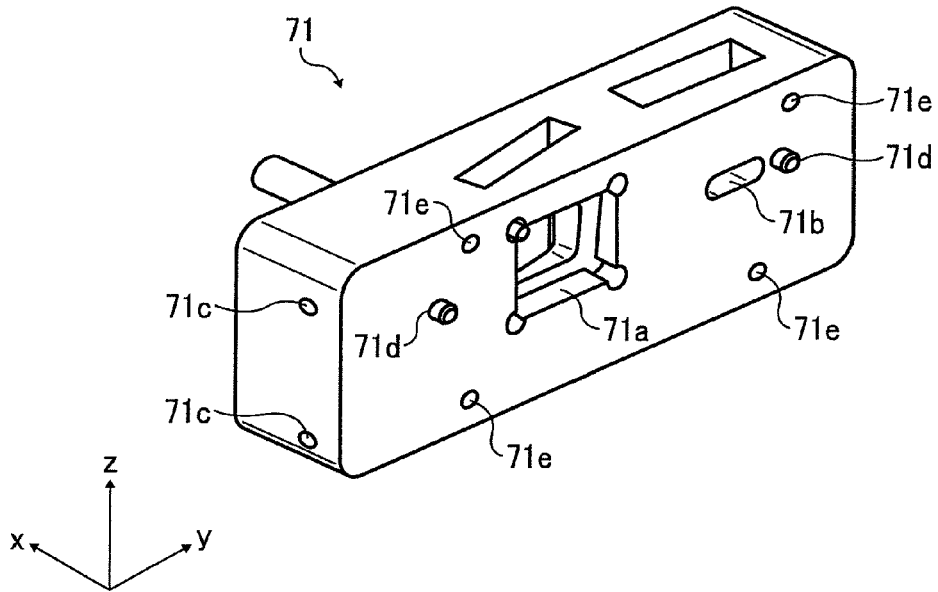
FIG. 10 is a second schematic perspective view illustrating the configuration of the intermediate holder.

FIG. 10 is a schematic perspective view of the intermediate holder 71 as viewed from the negative x-side.

Two reference pins 71d for use in determining positional relationship between the intermediate holder 71 and the optical element holder 72 stand upright on the negative-x-side surface of the intermediate holder 71 on longitudinally outer sides of the openings 71a and 71b. Four fixation holes 71e for use in joining the intermediate holder 71 to the optical element holder 72 are defined so as to surround the openings 71a and 71b.

Figure 11:
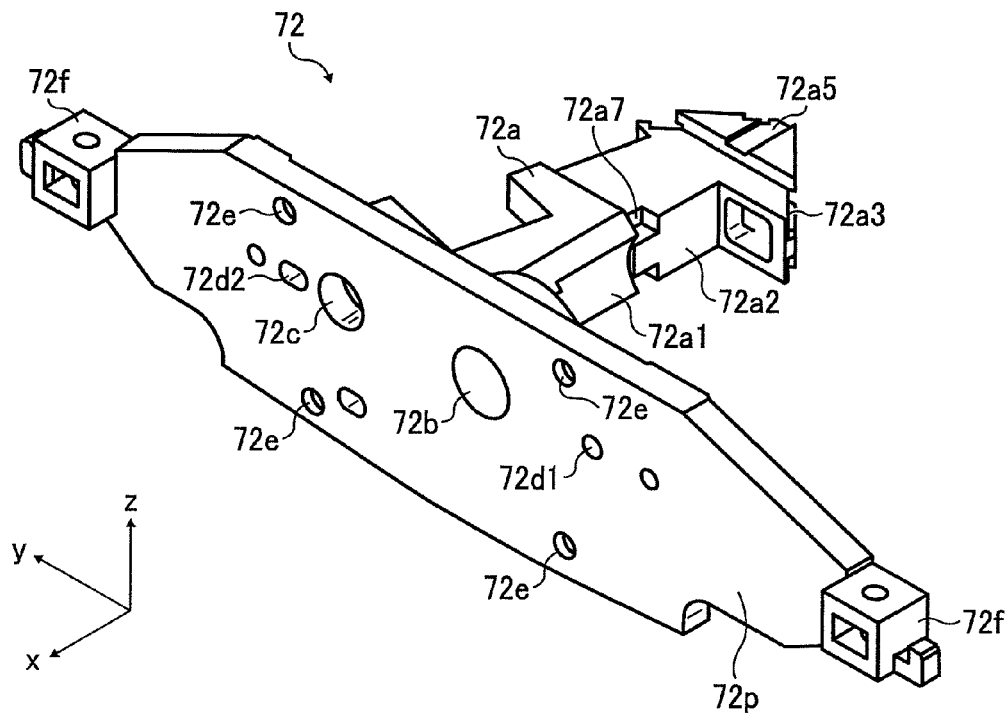
FIG. 11 is a first schematic perspective view illustrating the configuration of an optical element holder.
Figure 12:
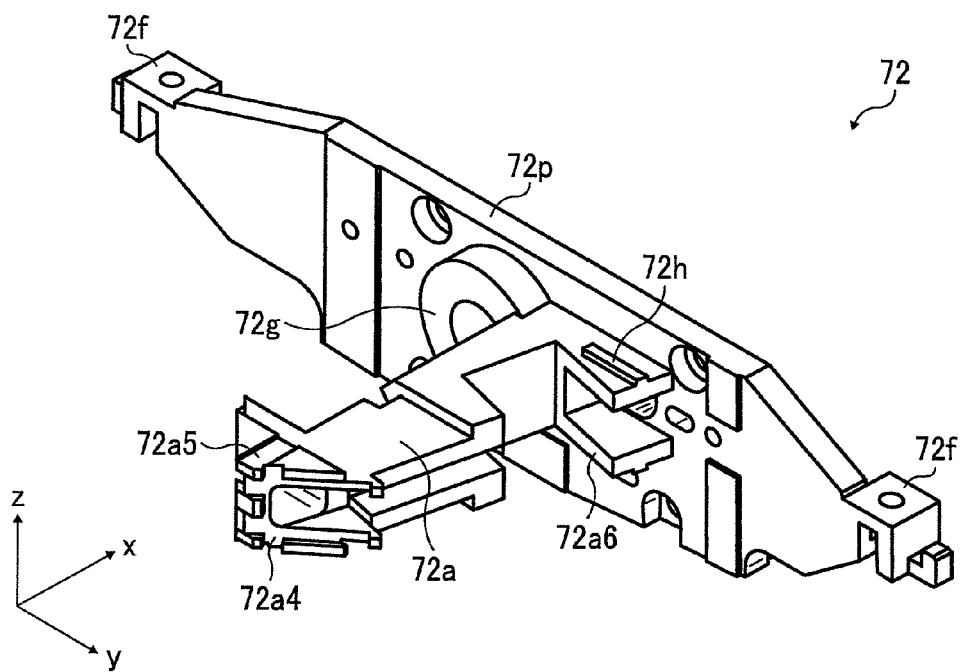
FIG. 12 is a second schematic perspective view illustrating the configuration of the optical element holder.

FIG. 11 is a schematic perspective view of the optical element holder 72 as viewed from the positive x-side. FIG. 12 is a schematic perspective view of the optical element holder 72 as viewed from the negative x-side.

The optical element holder 72 includes a tabular body plate 72p whose longer sides extend in the y-axis direction and the optical element retainer 72a that stands upright from a main surface of the body plate 72p in the negative x-direction to retain the optical elements.

As illustrated in FIG. 11, the body plate 72p has an opening 72b, through which optical beam (laser beam) emitted from the light source unit 10 passes, an opening 72c, through which optical beam (laser beam) that has returned by being guided by the front-monitor optical system passes, a main reference hole 72d1 and a sub reference hole 72d2 for use in positioning relative to the intermediate holder 71, and through holes 72e, into which the fastening screws are inserted to join the body plate 72p to the intermediate holder 71. The main reference hole 72d1 is a hole of diameter for receiving insertion of one of the reference pins 71d without play. In contrast, the sub reference hole 72d2, into which the other one of the reference pins 71d is to be inserted, has no play in the z-axis direction but has play in the y-axis direction for ease of insertion of the reference pin 71d. Light-source-apparatus supports 72f for use in installing the light source apparatus 70 on the optical-beam scanning apparatus 100 are provided on longitudinal opposite ends of the body plate 72p. An annular projection 72g is provided around the rim of opening 72b on the negative-x-side surface of the body plate 72p (FIG. 12).

On the negative-y-side surface of the optical element retainer 72a, the coupling-lens receiving portion 72a1, which is a concave surface conforming to a circumferential side surface of the coupling lens 11, the temperature-correcting-lens receiving portion 72a2, which is a flat surface orthogonal to the y-axis and receives one side surface of the temperature correction lens 12 that comes into contact therewith, and the aperture-mirror receiving portion 72a3, which includes two supports that support the aperture mirror 13 at the opposite ends of shorter sides of the aperture mirror 13 such that the aperture mirror 13 is inclined by −45 degrees relative to the xz-plane (rotated by 45 degrees toward the negative y-side) and is hollowed to allow laser beam to pass between the supports, are arranged in this order in the negative x-direction, or away from the body plate 72p (FIG. 11).

On the positive-y-side surface of the optical element retainer 72a, the reflecting-mirror receiving portion 72a4, which includes two supports that support the reflecting mirror 14 at the opposite ends of shorter sides of the reflecting mirror 14 such that the reflecting mirror 14 is inclined by +45 degrees relative to the xz-plane (rotated by 45 degrees toward the positive y-side) and is hollowed to allow laser beam to pass between the supports, and a second aperture receiving portion (not shown), which is arranged between the reflecting-mirror receiving portion 72a4 and the condensing-lens receiving portion 72a6 and brought into contact with the second aperture 15 to thereby position the second aperture 15, are arranged (FIG. 12). The condensing-lens receiving portion 72a6, which includes three supports, each of which is a recess open to the positive y-side in cross section, that come into contact with the optical flat surface of the condensing lens 16 at three positions to support the condensing lens 16, is provided on the body plate 72p at a positive-y-side root of the optical element retainer 72a (FIG. 12). A space in a hollow defined by these supports allows passage of laser beam therethrough and in communication with the opening 72c of the body plate 72p. A contacting portion (concave adhesive surface), at which the condensing lens 16 comes into contact with the three supports, on the three supports of the condensing-lens receiving portion 72a6 is a flat surface and is larger than an outside shape of the condensing lens 16.

Fitting grooves 72a5 are defined in the optical element retainer 72a at two positions, one of which is at a top portion in the z-axis direction and the other one is at a bottom portion, between the coupling-lens receiving portion 72a1 and the reflecting-mirror receiving portion 72a4; and fitting grooves 72a7 are defined in the optical element retainer 72a at two positions, one of which is at a top portion in the z-axis direction and the other one is at a bottom portion, between the coupling-lens receiving portion 72a1 and the temperature-correcting-lens receiving portion 72a2.

How to install the optical elements on the optical element retainer 72a will be described below individually.

Installation of the coupling lens 11 and the temperature correction lens 12 is performed as follows. After rotating the optical element holder 72 to cause the negative-y-side surface of the optical element retainer 72a to face upward, the coupling lens 11 is placed on the coupling-lens receiving portion 72a1 with the negative-y-side surface facing upward, and the temperature correction lens 12 is placed on the temperature-correcting-lens receiving portion 72a2. Each of the coupling lens 11 and the temperature correction lens 12 is adjusted in its position in the optical axis direction (x-axis direction) and fixed by indirect adhesion. The indirect adhesion is preferably performed by filling between each set of the receiving portion and the lens with ultraviolet cure adhesive in a layer of tens to hundreds of micrometers and irradiating the adhesive with ultraviolet rays for curing in a state where the receiving portion and the lens are held.

The condensing lens 16 is installed as follows. The optical element holder 72 is rotated to cause the positive-y-side surface of the optical element retainer 72a to face upward and ultraviolet cure adhesive is applied onto the three supports of the condensing-lens receiving portion 72a6 in advance. With the positive-y-side surface facing upward and the flat-surface side of the planoconvex lens of the condensing lens 16 contacting the three supports, position of the condensing lens 16 is adjusted in two directions, which are the y-axis and z-axis directions. Thereafter, the adhesive is cured by irradiation with ultraviolet rays for fixation. Because the two-axial adjustment is thus performed with the condensing lens 16 contacting the condensing-lens receiving portion 72a6, there is provided an advantage that positional adjustment can be performed easily.

Installation of the aperture mirror 13 and the reflecting mirror 14 is performed by causing the aperture mirror 13 mounted on the aperture-mirror receiving portion 72a3 and the reflecting mirror 14 on the reflecting-mirror receiving portion 72a4 to be held by a pressing force exerted by a pressure spring 13a, which is a single plate spring.

Figure 13:
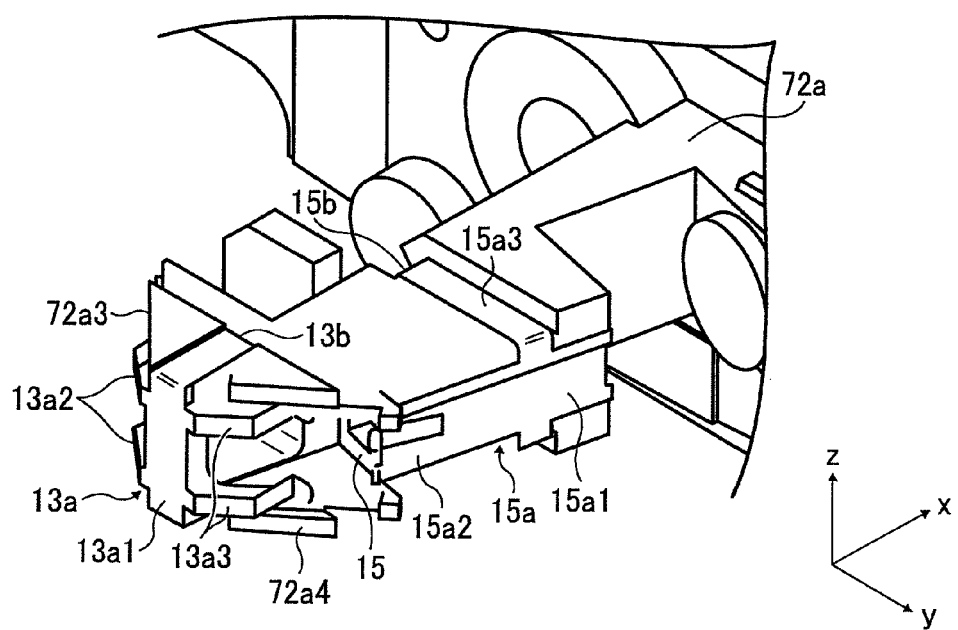
FIG. 13 is a schematic perspective view illustrating the configuration of an optical element retainer of the optical element holder.

FIG. 13 illustrates a state where the pressure spring 13a is attached to the optical element retainer 72a. The aperture mirror 13 and the reflecting mirror 14 are not depicted in FIG. 13. The pressure spring 13a includes two arm portions 13a2 that project toward the negative y-side from a spring body 13a1 fixed to the optical element retainer 72a and two arm portions 13a3 that project toward the positive y-side from the same and is symmetrical about a y-axial line and a z-axial line. Because each of the two arm portions 13a2 and the two arm portions 13a3 is bent relative to the spring body 13a1 and hence has a certain amount of resilience, when the spring body 13a1 is fixed to the optical element retainer 72a, the two arm portions 13a2 press the aperture mirror 13 toward the aperture-mirror receiving portion 72a3 and the two arm portions 13a3 press the reflecting mirror 14 toward reflecting-mirror receiving portion 72a4, thereby holding a corresponding one of the optical elements. The spring body 13a1 is bent into a C shape that is open to the x-axis direction; and x-axial leading ends of the C shape are further bent at the right angle along the z-axis, forming upright-bent portions 13b. The spring body 13a1 is fixed to the optical element retainer 72a by inserting the C shape portion of the spring body 13a1 into the two fitting grooves 72a5 of the optical element retainer 72a and further fitting the leading ends (upright-bent portions 13b), which are portions bent at the right angle of the C shape, in hook portions of the fitting grooves 72a5 (snap-in fitting). Because this fixation is performed by utilizing the resilience of the spring body 13a1, assembling and disassembling the spring body 13a1 to and from the optical element retainer 72a can be performed easily. Configuring the pressure spring 13a to have such a shape that is vertically symmetrical and horizontally symmetrical allows the optical element retainer 72a to be fixed in either an upward orientation and a downward orientation and eliminates the need of fixing the pressure spring 13a with an assembly screw. Therefore, the pressure spring 13a allows compact configuration and improvement in workability, which leads to cost reduction.

The second aperture 15 is installed by, as illustrated in FIG. 13, inserting the second aperture 15 into a groove defined in the optical element retainer 72a and holding the second aperture 15 by pressing the same from the positive x-side with a pressure spring 15a. The pressure spring 15a includes two arm portions 15a2 that project toward the negative x-side from a spring body 15a1 fixed to the optical element retainer 72a and is symmetrical about the x-axis. Because the two arm portions 15a2 are bent relative to the spring body 15a1 and hence have a certain amount of resilience, when the pressure spring 15a is fixed to the optical element retainer 72a, the two arm portions 13a2 press the second aperture 15 toward the negative x-side at the groove, thereby holding the second aperture 15. Meanwhile, two arm portions 15a3, one of which extends from a z-axial top end of the spring body 15a1 and the other of which extends from a z-axial bottom end of the same toward the negative y-side, are provided. Leading ends of the two arm portions 15a3 are then bent at the right angle, forming upright-bent portions 15b. The spring body 15a1 is fixed to the optical element retainer 72a by inserting the arm portions 15a3 into the two fitting grooves 72a7 in the optical element retainer 72a and further fitting the leading ends (upright-bent portions 15b), which are the leading ends of the arm portions 15a3 bent at the right angle, in hook portions of the fitting grooves 72a7 (snap-in fitting). This pressure spring 15b also allows compact configuration and improvement in workability, which leads to cost reduction.

As mentioned above, by making contrivance to the structure for holding each of the optical elements of the optical element holder 72, improvement in workability and cost reduction can be obtained in the procedure of assembling and adjusting the light source apparatus 70 as a unit.

How to join the intermediate holder 71 and the optical element holder 72 together will be described below.

One of the reference pins 71d (the reference pin on the negative y-side in FIG. 10) of the intermediate holder 71 is inserted into the main reference hole 72d1 (FIG. 11) of the optical element holder 72 while the other reference pin (the reference pin on the positive y-side in FIG. 10) is inserted into the sub reference hole 72d2 (FIG. 11). By this insertion, the intermediate holder 71 and the optical elements on the optical element holder 72 are located to have a fixed positional relationship. Because the intermediate support 71 and the vertical-cavity surface-emitting light source 10a of the light source unit 10 have the fixed positional relationship, joining the intermediate support 71 to the circuit board 75 locates the vertical-cavity surface-emitting light source 10a, the coupling lens 11, the temperature correction lens 12, and the aperture mirror 13 into a fixed positional relationship. In addition, positional relationship between the front-monitor optical system (reflecting mirror 14, the second aperture 15, and the condensing lens 16) and the PD 17 remains to be fixed. The intermediate holder 71 and the optical element holder 72 are preferably joined to each other by tightening fastening screw 79b inserted into the fixation holes 71e in the intermediate holder 71 through the through holes 72e in the optical element holder 72 so that this joint is performed in a state that the positional relationship between the vertical-cavity surface-emitting light source 10a and the coupling lens 11 and also the positional relationship among the vertical-cavity surface-emitting light source 10a, the front-monitor optical system, and the PD 17 are determined at high accuracy (FIGS. 5A and 5B). Each of the intermediate holder 71 and the optical element holder 72 is preferably formed from aluminum alloy of similar linear expansivity so as to minimize positional deviation from the positioned state. With the optical-beam scanning apparatus 100, to which the light source apparatus 70 according to the embodiment is attached, positions and angles can be adjusted without changing positional relationships among the light source unit 10, the coupling lens 11, the temperature correction lens 12, the aperture mirror 13, the reflecting mirror 14, the second aperture 15, the condensing lens 16, and the PD 17. This makes it possible to adjust pitches of scan lines to be formed on the surfaces of the photosensitive drums 30A to 30D possible accurately.

Figure 14:
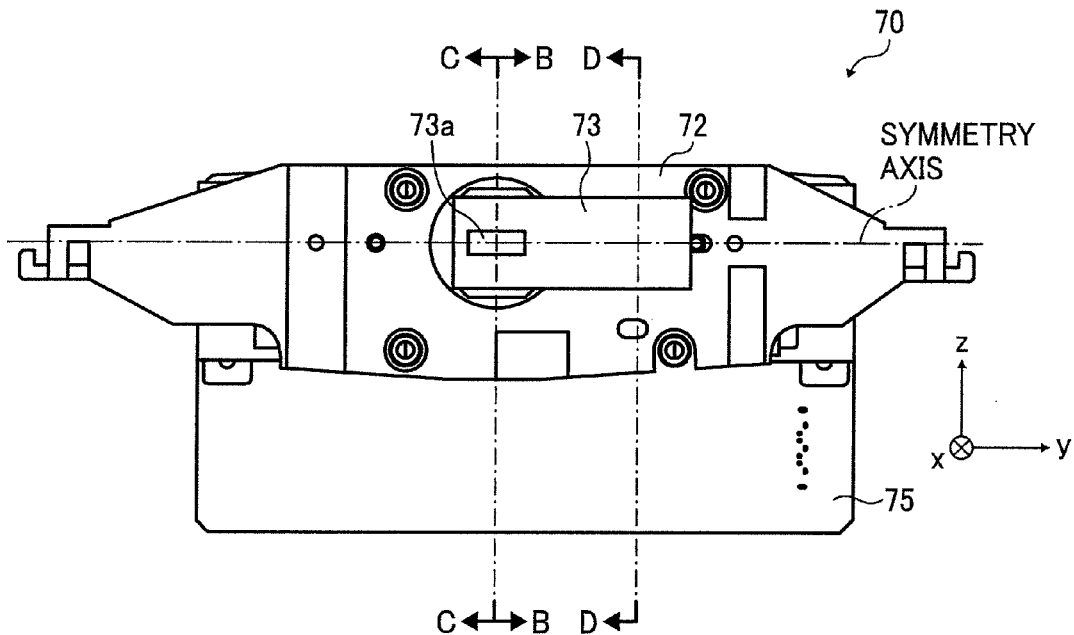
FIG. 14 is a schematic front view illustrating the configuration of the light source apparatus according to an embodiment.

FIG. 14 is a schematic external front view of the light source apparatus 70.

As illustrated in FIG. 14, the light source apparatus 70 includes the protection cover 73 that covers the entire optical element retainer 72a. The protection cover 73 is a box-shaped hollow member that has depth in the negative x-direction and covers the optical elements (coupling lens 11, the temperature correction lens 12, the aperture mirror 13, the reflecting mirror 14, the second aperture 15, and the condensing lens 16) to protect the optical elements from receiving damages.

An opening 73a, through which laser beam having passed through the aperture mirror 13 exits to the outside, is defined in the negative x-side surface of the protection cover 73; and a fitting hole 73b is defined in each of the positive z-side surface and the negative z-side surface of the protection cover 73 (FIG. 4).

The protection cover 73 has a shape symmetrical about a symmetry axis extending in the y-axis direction in FIG. 14. In the process of attaching the protection cover 73 to the optical element retainer 72a, the protection cover 73 is inserted smoothly because an internal surface of the protection cover 73 extending in the z-axis direction is guided by two flat surfaces on the optical element retainer 72a extending in the z-axis direction, and the protection cover 73 is fixed at an appropriate position because the fitting holes 73b of the protection cover 73 engage with protrusions 72h provided near the condensing-lens receiving portion 72a6 of the optical element retainer 72a. The condensing lens 16 has such an outside shape that the condensing lens 16 does not protrude from the concave adhesive surface of the condensing-lens receiving portion 72a6, this attachment can be performed smoothly.

The light source apparatus 70 configured as mentioned above is attached to the housing of the optical-beam scanning apparatus 100 to be rotatable about an axis that is substantially parallel to the optical axis of the coupling lens 11. A keyhole-like opening, which is a combination of a fitting hole, into which the light source apparatus 70 is to be attached, and a relief portion, is defined in the housing of the optical-beam scanning apparatus 100. The inner diameter of the fitting hole is set to be substantially equal to the outside shape of the annular projection 72g on the optical element holder 72 while the relief portion is set to be sufficiently larger than a portion of the protection cover 73 that extends out of the annular projection 72g toward the positive y-side. Because the external size of the protection cover 73 is thus smaller than the (keyhole-like shape) opening of the fitting hole and relief portion defined in the housing of the optical-beam scanning apparatus 100, it is possible, with the protection cover 73 attached to the optical apparatus 70, not only to assemble the optical apparatus 70 to the housing of the optical-beam scanning apparatus 100 but also to perform gamma-correction by using an adjustment mechanism (not shown).

Each of the optical elements and a holding unit that holds the optical elements preferably has a shape that is symmetrical about an axis on a plane that contains the optical axis.

Figure 15:
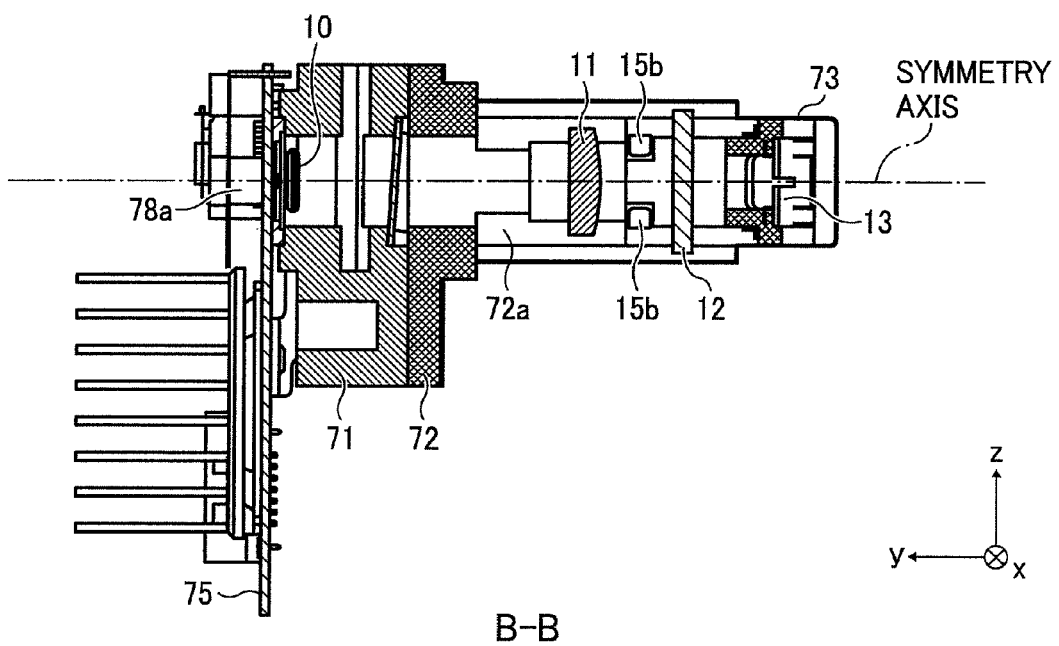
FIG. 15 is a cross-sectional view of the light source apparatus taken along line B-B of FIG. 14.
Figure 16:
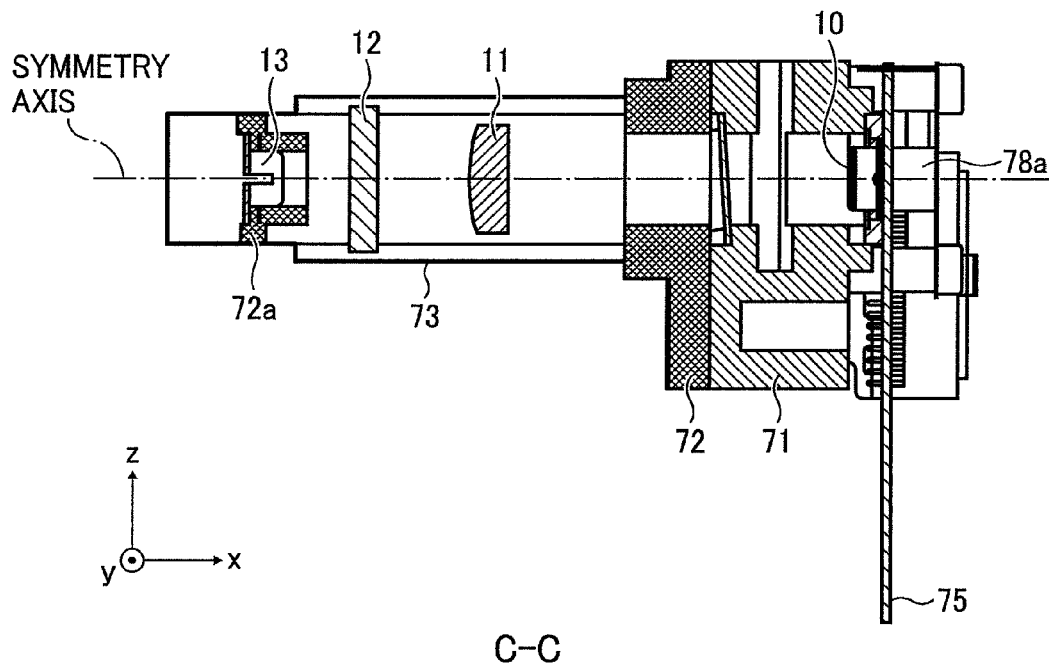
FIG. 16 is a cross-sectional view of the light source apparatus taken along line C-C of FIG. 14.
Figure 17:
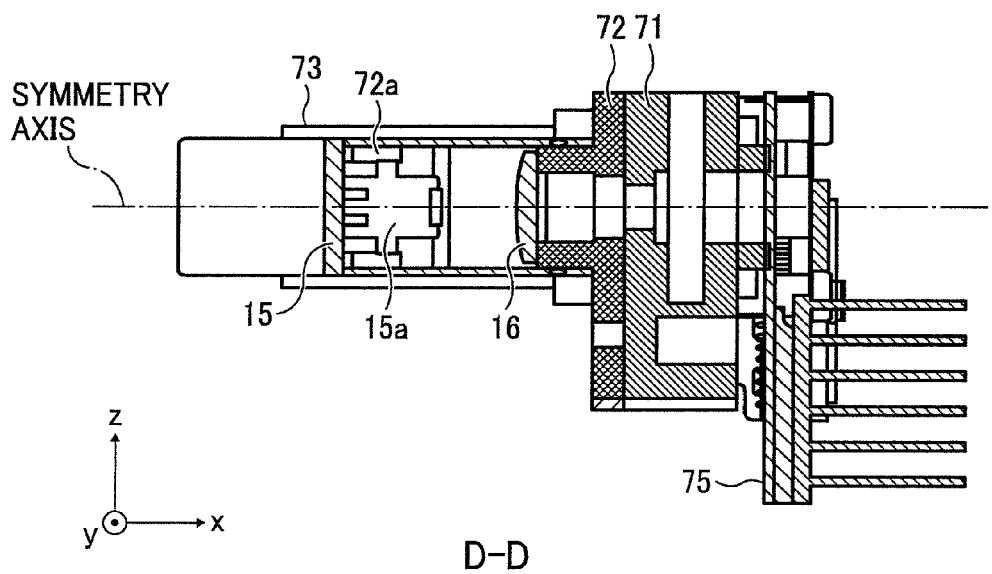
FIG. 17 is a cross-sectional view of the light source apparatus taken along line D-D of FIG. 14.

FIGS. 15 to 17 illustrate examples of such configurations. FIG. 15 is a cross-sectional view taken along line B-B of FIG. 14. FIG. 16 is a cross-sectional view taken along line C-C of FIG. 14. FIG. 17 is a cross-sectional view taken along line D-D of FIG. 14.

In FIGS. 15 and 16, the coupling lens 11, the temperature correction lens 12, the aperture mirror 13, the optical element retainer 72a, and the protection cover 73 are symmetrical about a symmetry axis extending in the x-axis direction. Also in FIG. 17, the second aperture 15, the pressure spring 15a, the condensing lens 16, the optical element retainer 72a, and the protection cover 73 are symmetrical about the symmetry axis extending in the x-axis direction. Although not depicted in FIGS. 15 to 17, the reflecting mirror 14 and the pressure spring 13a are also symmetrical about the symmetry axis extending in the x-axis direction.

Because the components of the optical system are thus symmetrical about the symmetric axis that is on the plane that contains the optical axis and extends in the x-axis direction, the optical element retainer 72a is highly stable in shape (unbalanced residual stress and distortion are less likely to occur). Because the pressing members (pressure spring 13a and 15a) can exert pressure evenly with the symmetric axis therebetween, the optical elements (the coupling lens 11, the temperature correction lens 12, the aperture mirror 13, the reflecting mirror 14, the second aperture 15, and the condensing lens 16) are highly stable in orientation, and even when environmental temperature fluctuates, the optical elements behave stably and are less likely deviate from the optical axis due to expansion and shrinking.

According to aspects of the present invention, a vertical-cavity surface-emitting light source (two-dimensional array light-emitting device) can be positioned without fail and the position of the vertical-cavity surface-emitting light source relative to a coupling lens is maintained stably. This allows to maintain image-forming characteristics stably and provide stable image quality over time. Particularly, according to one of the aspects of the invention, because three reference surfaces of a package come into contact with an abutment of an intermediate holder, the vertical-cavity surface-emitting light source housed in the package can be positioned in the three-axial directions highly accurately, which makes beam spots of beams emitted from light sources of the vertical-cavity surface-emitting light source uniform and forming a high-definition image possible. According to another one of the aspects of the invention, because the vertical-cavity surface-emitting light source is held in a positioned state, development of component defect on the circuit board can be prevented and reliability of image quality is increased.

According to another aspect of the present invention, because a front-monitor optical system is configured as a one-piece unit, positional relationship between light sources and the front-monitor optical system can be maintained even when environmental temperature fluctuates, and automatic optical-output-power-level control (APC) for controlling optical intensity of the vertical-cavity surface-emitting light source can be performed highly accurately.

According to still another aspect of the present invention, because each of a plurality of optical elements and a holding unit has a shape that is symmetrical about an axis (e.g., a symmetry axis extending in the optical axis direction) on a plane that contains the optical axis, deviation from the optical axis is less likely to occur even when environmental temperature fluctuates. This allows to prevent degradation in optical characteristics, thereby providing stable image quality over time.

According to still another aspect of the present invention, a highly reliable optical-beam scanning apparatus capable of providing stable image quality over time is provided.

According to still another aspect of the present invention, a highly reliable image forming apparatus capable of providing stable image quality over time is provided. The image forming apparatus is also advantageous in that it performs writing with a plurality of beams, which increases productivity and hence allows to reduce linear velocity, contributing to energy saving.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source apparatus comprising:
a circuit board on which a light source unit and a photodetector are mounted, the light source unit including a vertical-cavity surface-emitting light source and a package, the vertical-cavity surface-emitting light source being formed with a two-dimensional array of a plurality of light-emitting sources arranged on a plane vertical to an optical axis along which an optical beam is emitted, the package housing the vertical-cavity surface-emitting light source, the photodetector detecting intensity of the optical beam emitted from the light source unit, a surface of the photodetector being parallel to a surface of the circuit board;
an optical element holder that includes a beam splitting device that splits the optical beam emitted from the vertical-cavity surface-emitting light source into a plurality of optical beams, and a condense lens that condenses one of the optical beams split by the beam splitting device to the photodetector; and
an intermediate holder that is arranged between the circuit board and the optical element holder, the intermediate holder including a first positioning unit and a second positioning unit, the first positioning unit being in contact with the package and determining a first positional relationship between the intermediate holder and the circuit board along the direction vertical to the optical beam, the second positioning unit determining a second positional relationship between the intermediate holder and the optical element holder along the direction vertical to the optical beam, the intermediate holder being joined to the circuit board to cover an area of the circuit board on which the light source unit is mounted to thereby make contact with the package via the first positioning unit such that the vertical-cavity surface-emitting light source is positioned and fixed and being joined to the optical element holder to thereby position the beam splitting device and condense lens to the vertical-cavity surface-emitting light source and the photodetector along the direction vertical to the optical beam.

2. The light source apparatus according to claim 1, wherein the package has three reference surfaces including
a first reference surface extending in an optical-axis direction,
a second reference surface extending in a main-scanning direction vertical to the optical axis, and
a third reference surface extending in a sub-scanning direction vertical to the optical axis and the main-scanning direction, and wherein
the intermediate holder includes an abutment with which the three reference surfaces make contact to position the vertical-cavity surface-emitting light source.

3. The light source apparatus according to claim 1, further comprising a pressing member that presses the package toward the intermediate holder via the circuit board from a surface opposite to a surface where the light source unit is mounted.

4. The light source apparatus according to claim 1, wherein each of the beam splitting device, condense lens and a holding unit has a shape that is symmetrical about an axis on a plane including the optical axis.

5. An optical-beam scanning apparatus comprising:
a light source apparatus that includes
a circuit board on which a light source unit and a photodetector are mounted, the light source unit including a vertical-cavity surface-emitting light source and a package, the vertical-cavity surface-emitting light source being formed with a two-dimensional array of a plurality of light-emitting sources arranged on a plane vertical to an optical axis along which an optical beam is emitted, the package housing the vertical-cavity surface-emitting light source, the photodetector detecting intensity of the optical beam emitted from the light source unit, a surface of the photodetector being parallel to a surface of the circuit board,
an optical element holder that includes a beam splitting device that splits the optical beam emitted from the vertical-cavity surface-emitting light source into a plurality of optical beams, and a condense lens that condenses one of the optical beams split by the beam splitting device to the photodetector, and
an intermediate holder that is arranged between the circuit board and the optical element holder, the intermediate holder including a first positioning unit and a second positioning unit, the first positioning unit being in contact with the package and determining a first positional relationship between the intermediate holder and the circuit board along the direction vertical to the optical beam, the second positioning unit determining a second positional relationship between the intermediate holder and the optical element holder along the direction vertical to the optical beam, the intermediate holder being joined to the circuit board to cover an area of the circuit board on which the light source unit is mounted to thereby make contact with the package via the first positioning unit such that the vertical-cavity surface-emitting light source is positioned and fixed and being joined to the optical element holder to thereby position the beam splitting device and condense lens to the vertical-cavity surface-emitting light source and the photodetector along the direction vertical to the optical beam;
a deflecting unit that deflects the optical beam emitted from the light source apparatus; and
an image-forming optical system that forms an image on a scanning surface with the optical beam deflected by the deflecting unit.

6. An image forming apparatus comprising:
an optical-beam scanning apparatus that includes
a light source apparatus that includes
a circuit board on which a light source unit and a photodetector are mounted, the light source unit including a vertical-cavity surface-emitting light source and a package, the vertical-cavity surface-emitting light source being formed with a two-dimensional array of a plurality of light-emitting sources arranged on a plane vertical to an optical axis along which an optical beam is emitted, the package housing the vertical-cavity surface-emitting light source, the photodetector detecting intensity of the optical beam emitted from the light source unit, a surface of the photodetector being parallel to a surface of the circuit board, an optical element holder that includes a beam splitting device that splits the optical beam emitted from the vertical-cavity surface-emitting light source into a plurality of optical beams, and a condense lens that condenses one of the optical beams split by the beam splitting device to the photodetector, and an intermediate holder that is arranged between the circuit board and the optical element holder, the intermediate holder including a first positioning unit and a second positioning unit, the first positioning unit being in contact with the package and determining a first positional relationship between the intermediate holder and the circuit board along the direction vertical to the optical beam, the second positioning unit determining a second positional relationship between the intermediate holder and the optical element holder along the direction vertical to the optical beam, the intermediate holder being joined to the circuit board to cover an area of the circuit board on which the light source unit is mounted to thereby make contact with the package via the first positioning unit such that the vertical-cavity surface-emitting light source is positioned and fixed and being joined to the optical element holder to thereby position the beam splitting device and condense lens to the vertical-cavity surface-emitting light source and the photodetector along the direction vertical to the optical beam;

a deflecting unit that deflects the optical beam emitted from the light source apparatus;

an image-forming optical system that forms an image on a scanning surface with the optical beam deflected by the deflecting unit;

a photosensitive member on which the optical beam from the optical-beam scanning apparatus is focused to form an electrostatic image;

a developing unit that develops the electrostatic image formed on the photosensitive member with toner to obtain a toner image; and a transfer unit that transfers the toner image onto a recording medium.

\* \* \* \* \*